Figure 13:
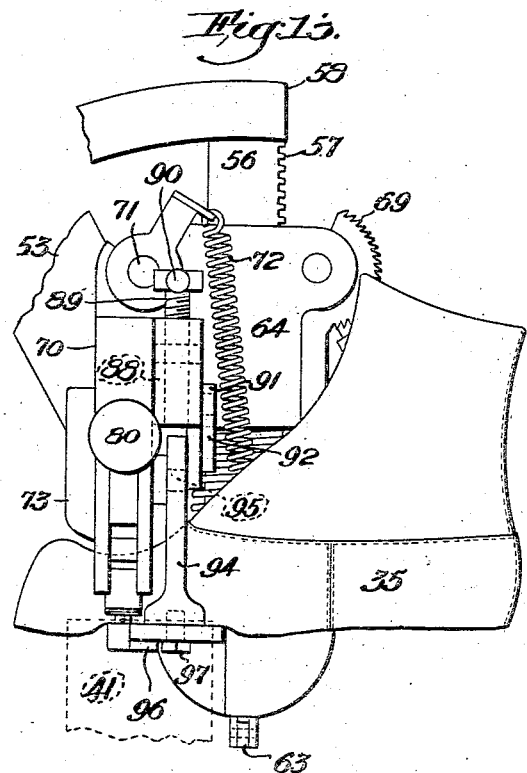

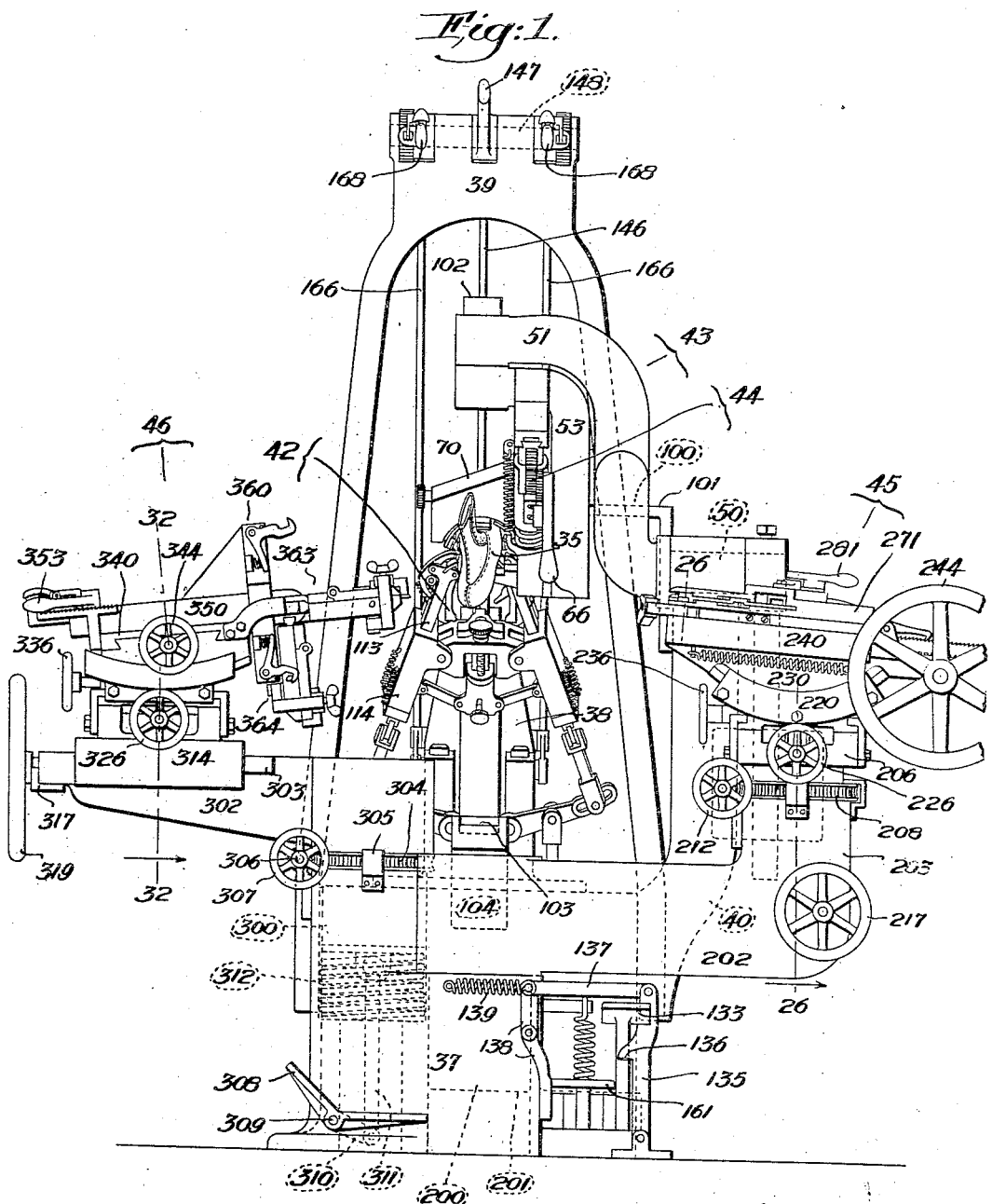

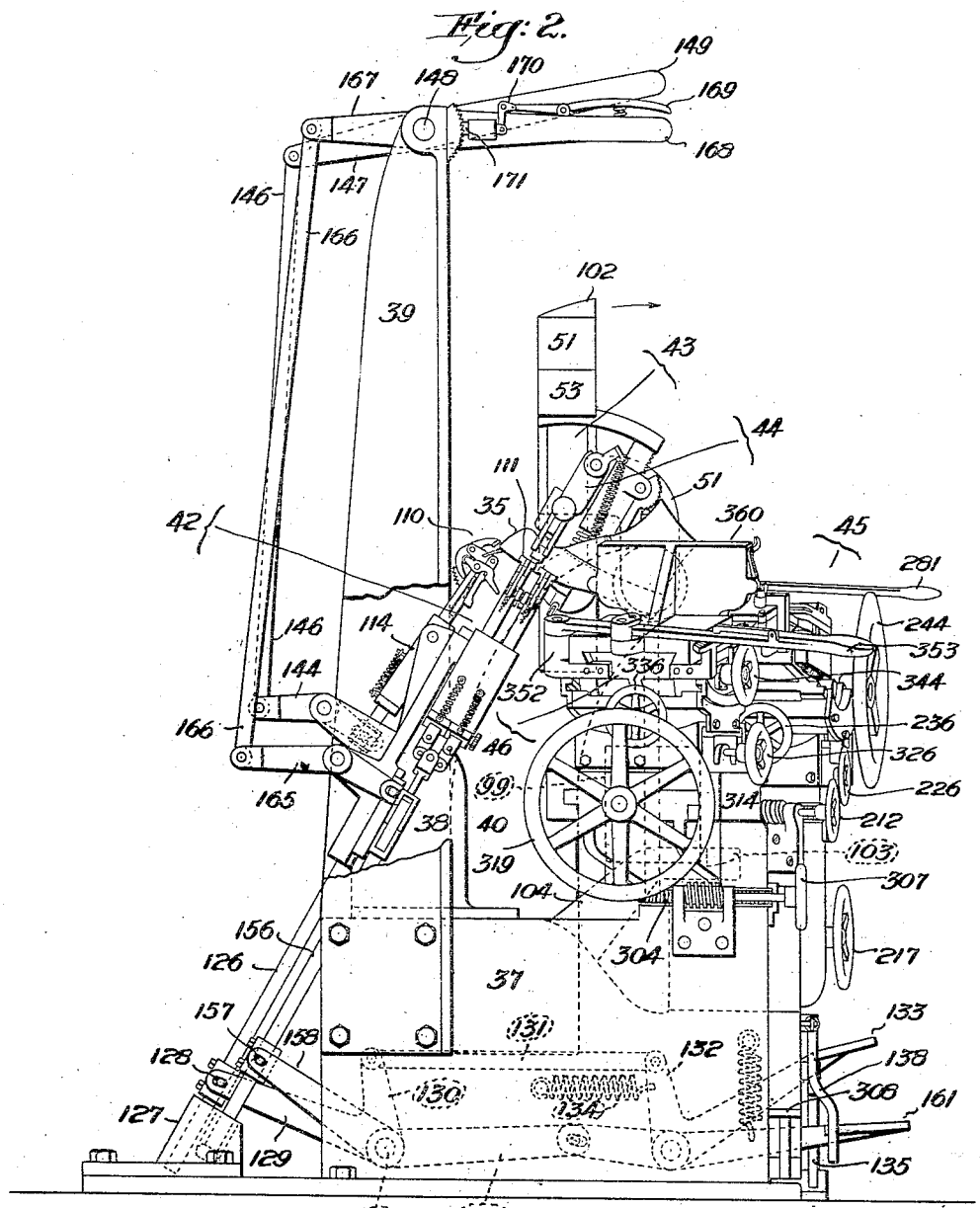

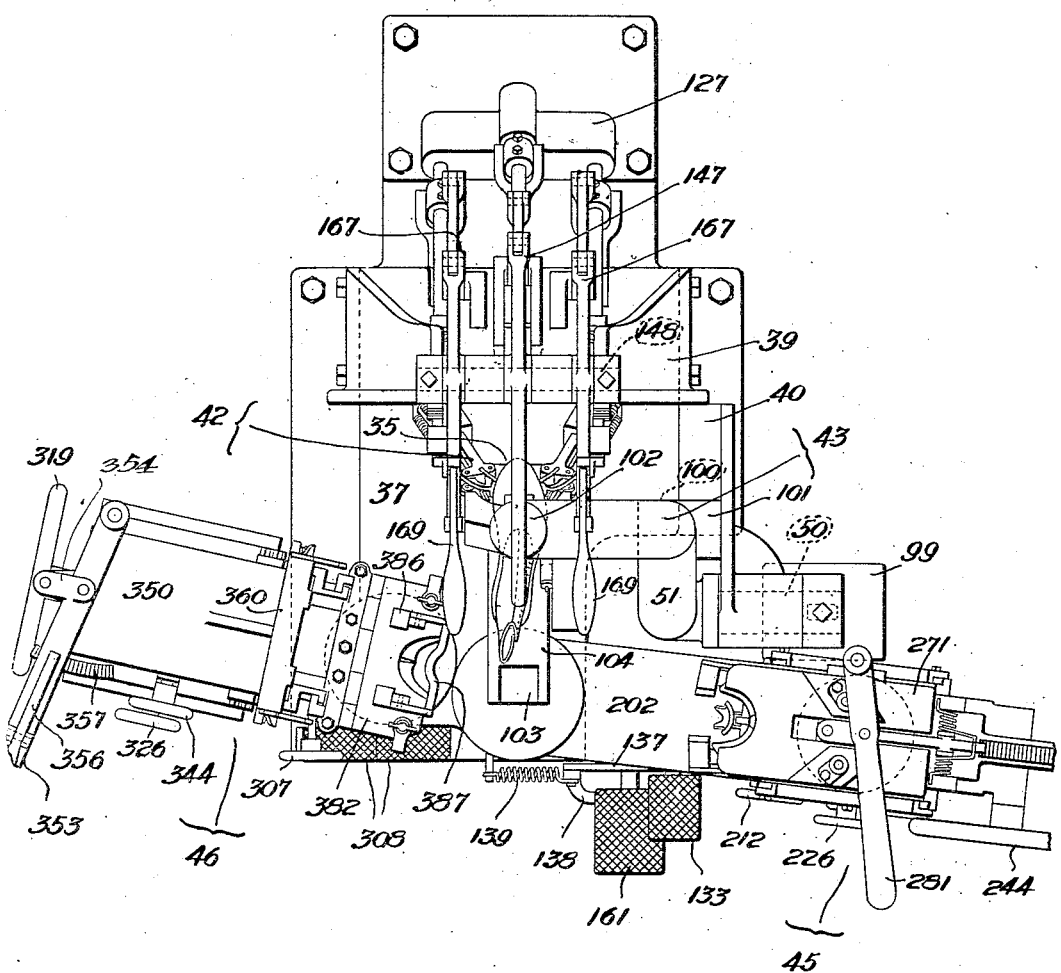

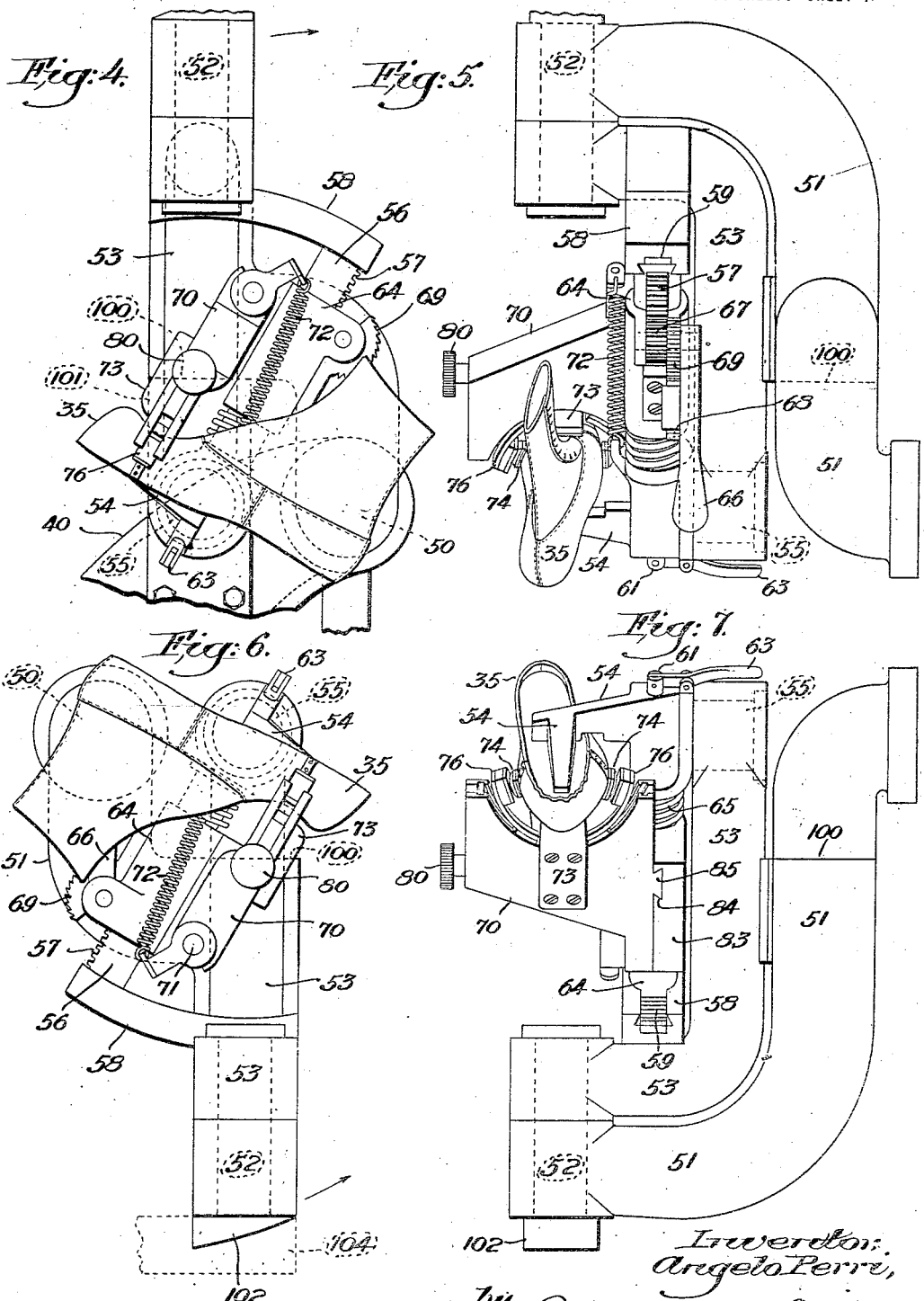

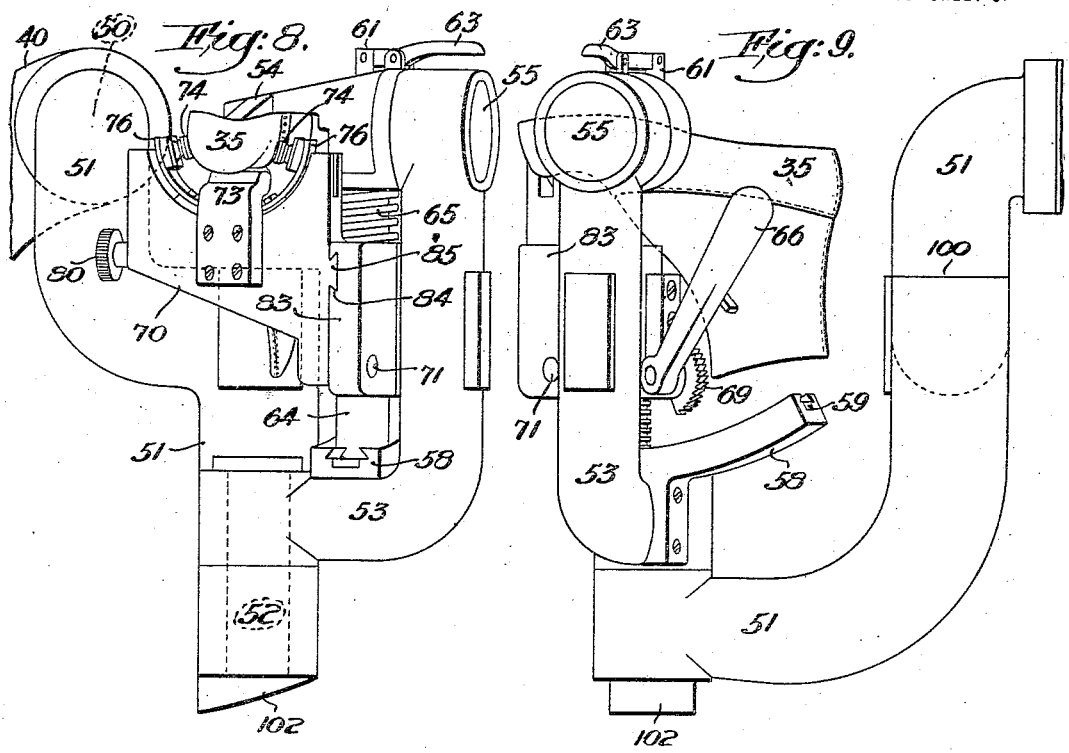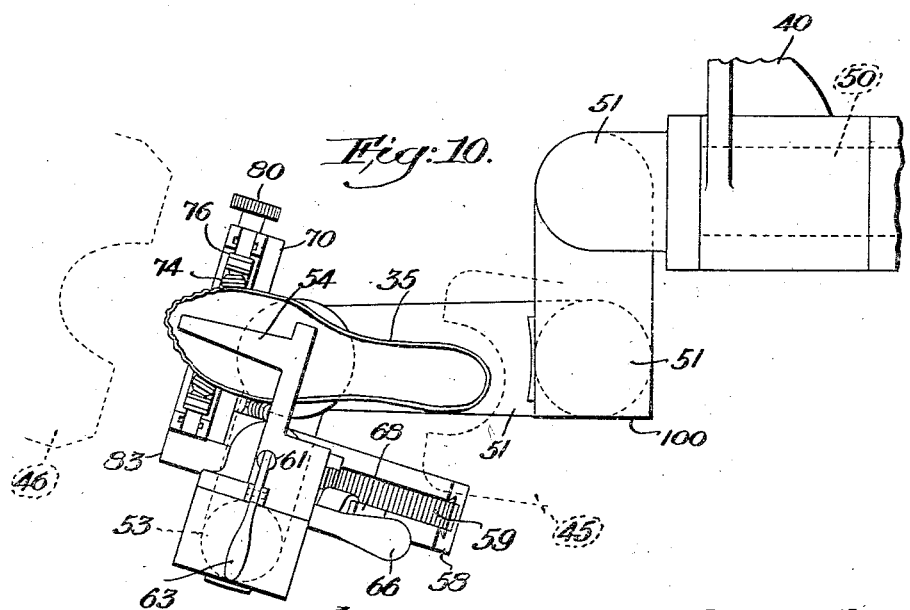

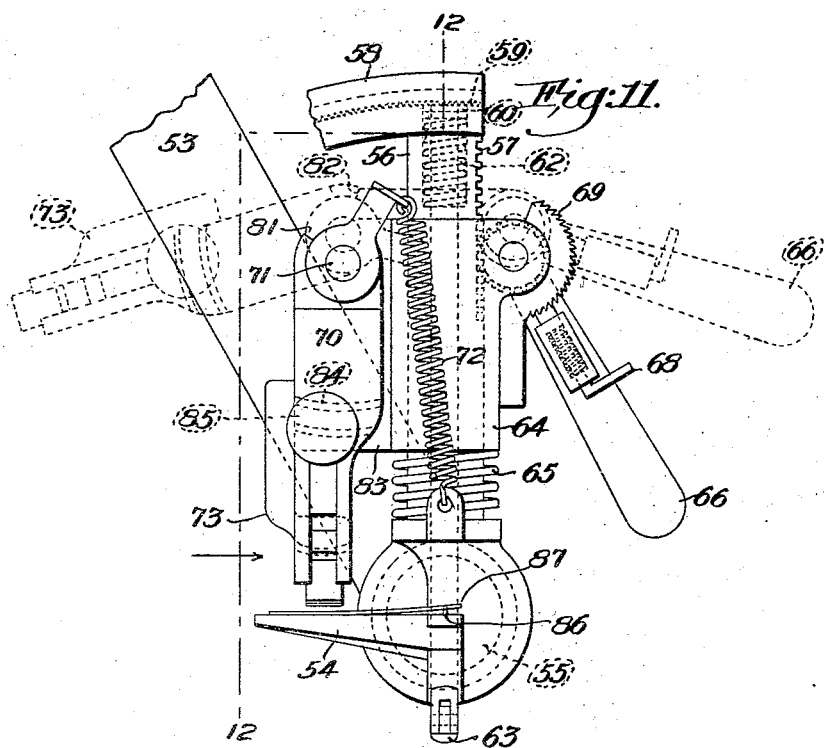
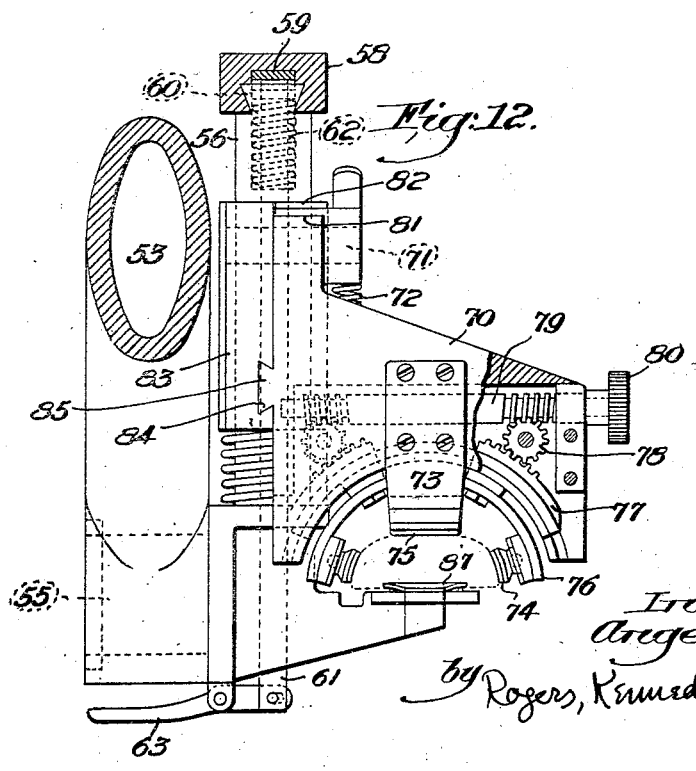

A. PERRI.
LASTING MACHINE.
APPLICATION FILED AUG. 26, 1915.

1,168,963.

Patented Jan. 18, 1916.
11 SHEETS—SHEET 7.

Inventor,
Angelo Perri,
by Rogers, Kennedy & Campbell
his Attys.

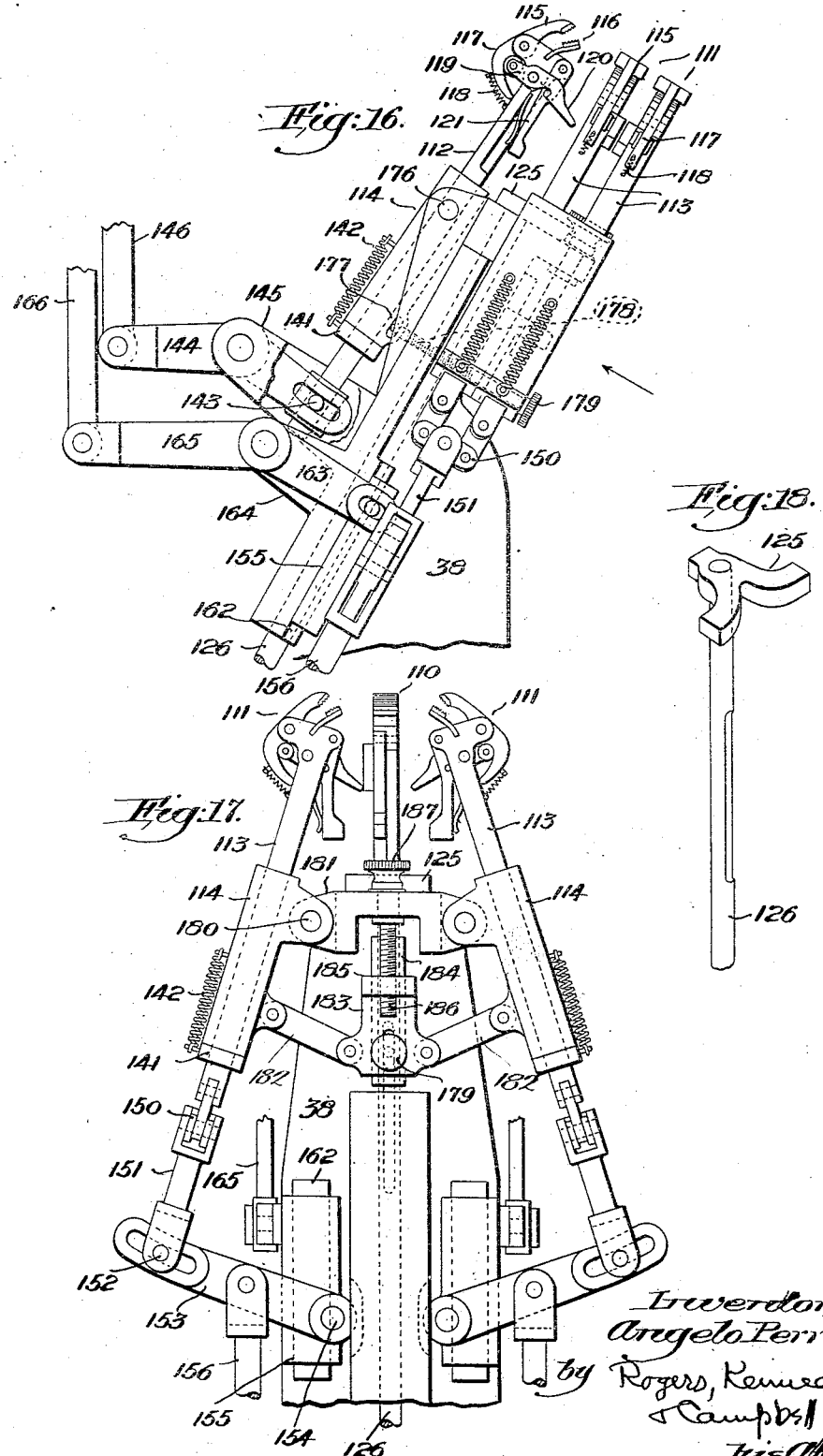

A. PERRI.
LASTING MACHINE.
APPLICATION FILED AUG. 26, 1915.
1,168,963.
Patented Jan. 18, 1916.
11 SHEETS—SHEET 9.
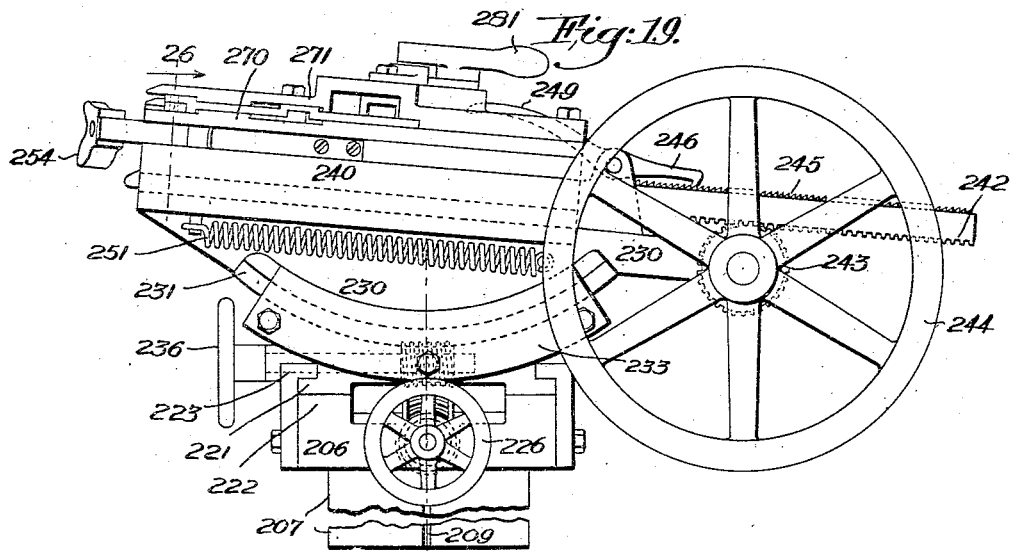
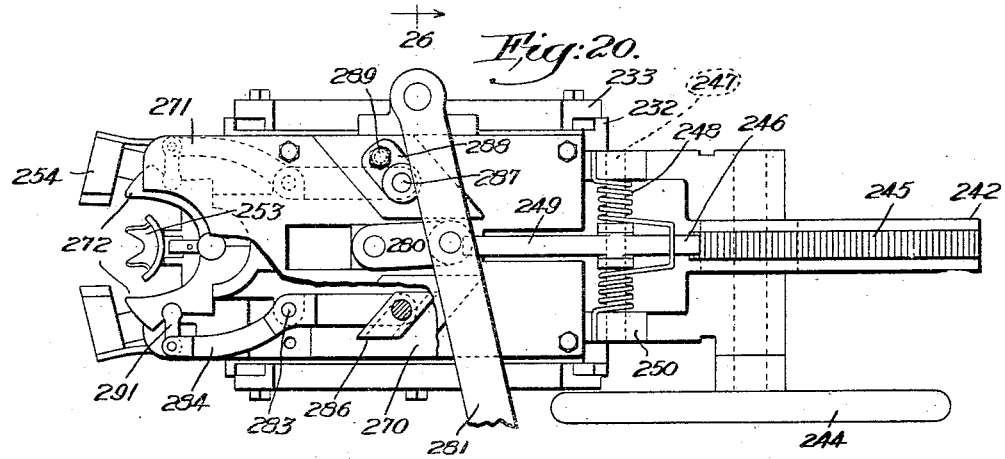
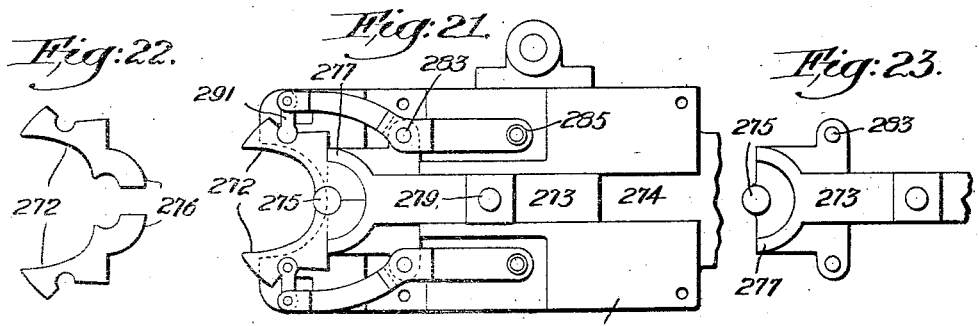
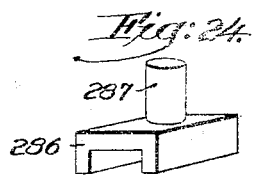

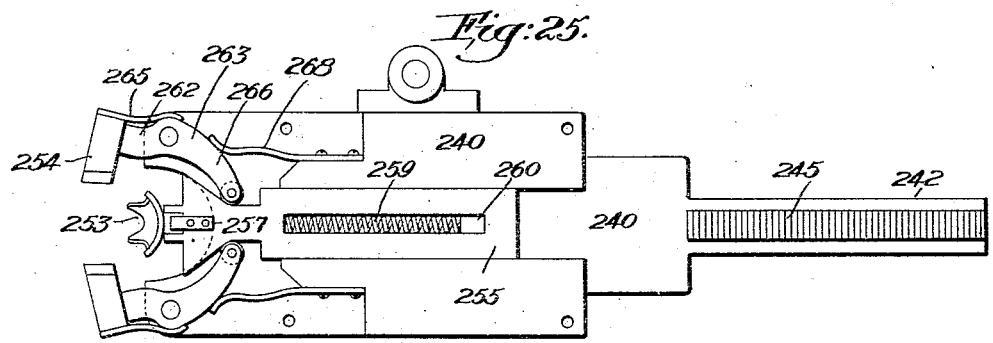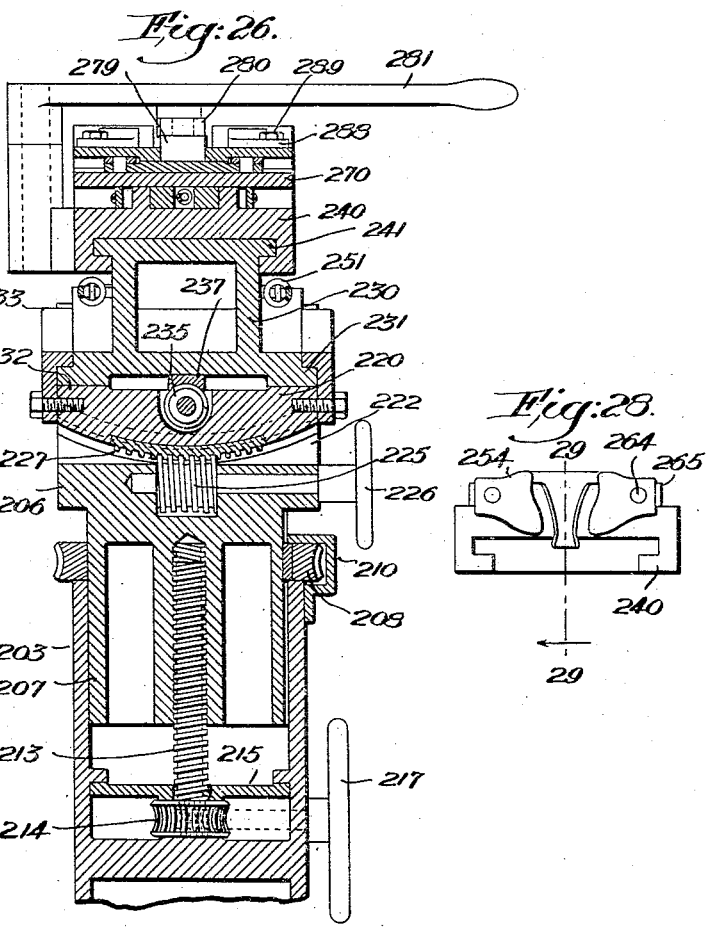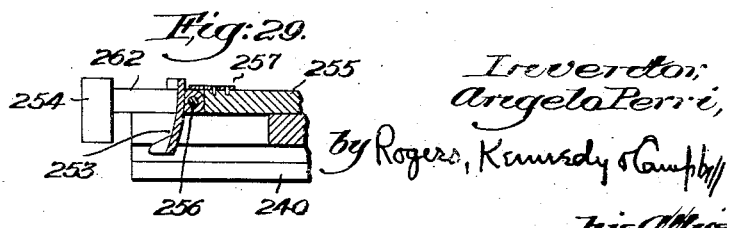

A. PERRI.
LASTING MACHINE.
APPLICATION FILED AUG. 26, 1915.
1,168,963.
Patented Jan. 18, 1916.
11 SHEETS—SHEET 11.
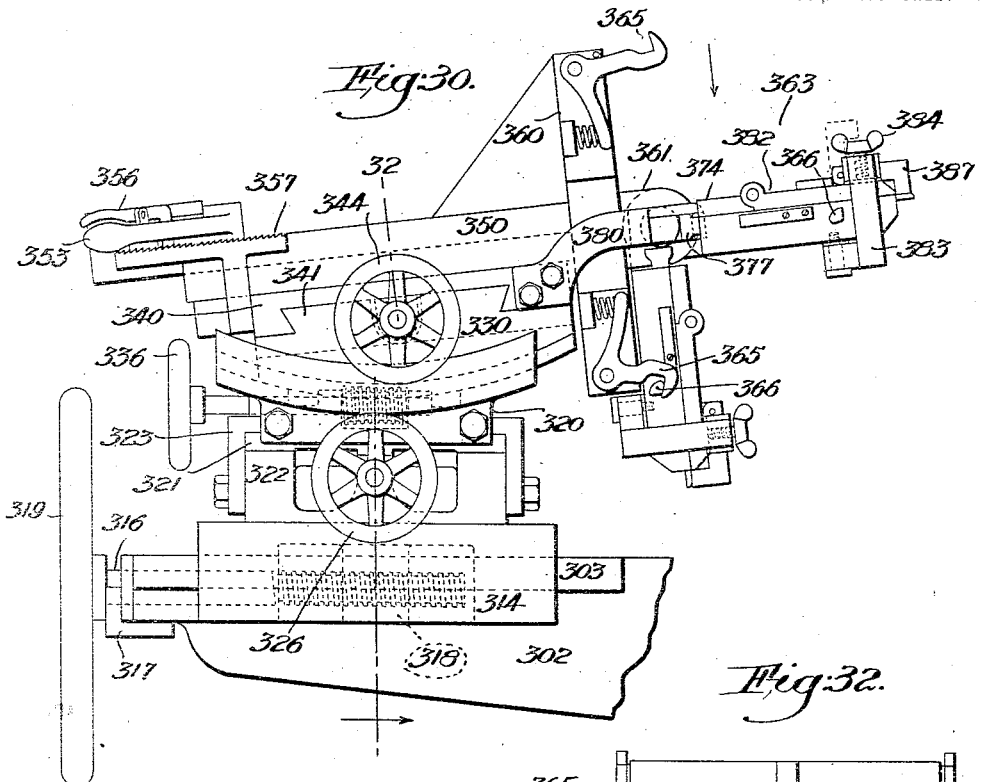
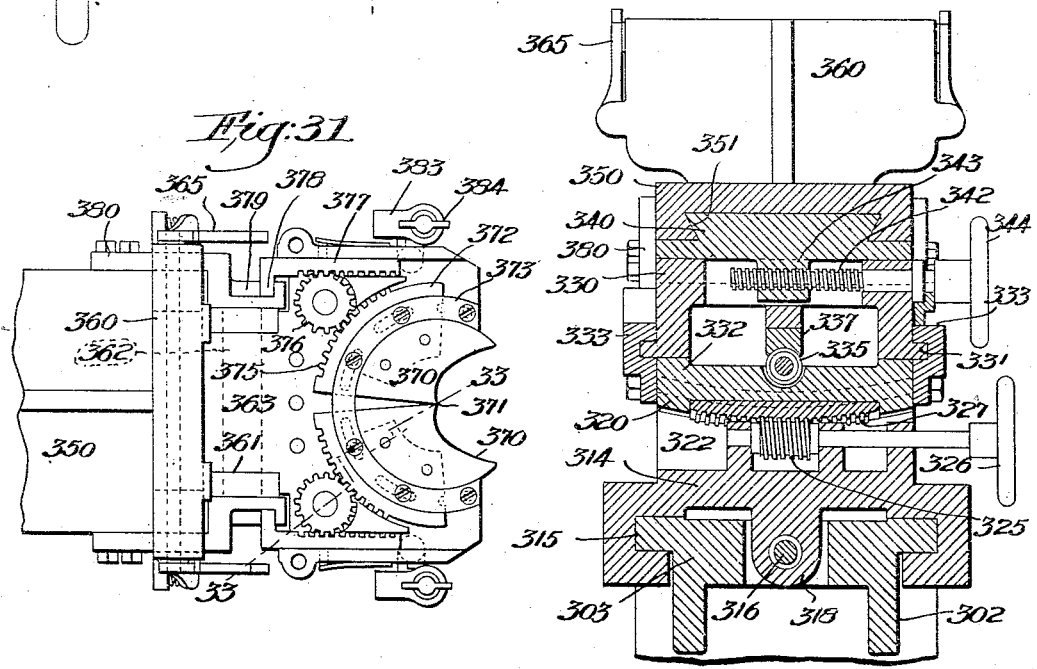
Inventor,
Angelo Perri,
by Rogers, Kennedy & Campbell
his Attys

UNITED STATES PATENT OFFICE.

ANGELO PERRI, OF GROVELAND, MASSACHUSETTS, ASSIGNOR TO REECE SHOE MACHINERY COMPANY, OF BOSTON, MASSACHUSETTS, A CORPORATION OF MAINE.

LASTING-MACHINE.

1,168,963.  Specification of Letters Patent.  Patented Jan. 18, 1916.

Application filed August 26, 1915.   Serial No. 47,437.

*To all whom it may concern:*

Be it known that I, ANGELO PERRI, a citizen of the United States, residing at Groveland, in the county of Essex and State of Massachusetts, have invented certain new and useful Improvements in Lasting-Machines, of which the following is a specification, reference being had therein to the accompanying drawing.

This invention pertains to the art of shoe lasting and involves a novel shoe lasting machine. In the manufacture of shoes by various systems, a sectional wooden last, or some other removable last, is employed for the purpose of giving form to the upper of the shoe. The upper is usually made of flexible leather and provided with a cloth lining. The finished shoe comprises an insole or an outsole or both. The lasting process is for the purpose of shaping the upper and assembling or securing it with the sole (insole or outsole), about the last as a form. The lasting process involves the preliminary step of loosely assembling the upper, the last and the sole.

The operations with which the present invention is particularly concerned, comprise what may be considered as three distinct steps. The first of these steps is the "pulling-over" operation. This consists in preliminarily forcibly pulling the upper around the last at the fore part of the shoe, namely, at the front of the toe and at the two sides near the toe. This pulling-over operation customarily includes a temporary securing of the margin of the pulled-over upper to the bottom side of the sole and last by means of tacks or other securing means. The second step or operation is what is usually known as the "side lasting" operation. This consists in smoothing or "wiping" the side margins of the upper about the last along the sides or "shanks" of the shoe, and in this region securing the upper to the sole for example, by means of tacks driven through the upper and sole, and clenched against the metal bottom of the last. The final operation includes the lasting of the heel and the toe, both of which are usually performed in a single machine. The operation consists in smoothing or wiping and pressing the overhanging material of the upper into place about the last and securing it. At the heel the securing is usually permanently done by tacking through the upper and sole by tacks which are clenched against the last. At the toe the securing may consist of a permanent tacking, according to the McKay system of shoe manufacture, but in the welt system the securing of the edges of the welt at the toe is temporarily effected, for example, by means of a short piece of wire held by temporary nails. These described operations constituting the lasting process are preparatory to the subsequent steps in the manufacture of the shoe, which with some systems include the attachment of the outsole, this in the case of the welt system being preceded by the stitching to the margin of the upper of a strip or "welt" to which the outsole is subsequently stitched.

Heretofore in practice the three operations referred to, namely, the pulling-over, the side lasting and the heel and toe lasting, have sometimes been done entirely by hand. In other cases, the operations have been performed partly by hand and partly by machine. When done entirely by machine, the lasting process has in practice invariably involved the use of at least three separate machines, one for the pulling-over operation, one for the side lasting operation, and one or two for the lasting of the heel and toe. So far as I am aware, there has been no practical or successful single machine heretofore employed for any two or all three of these operations.

The principal object of the present invention is to minimize in the number of machines and, therefore, in the number of operations and amount of handling required in the manufacture of a shoe, and, more especially, to afford a single lasting machine in which the shoe, that is the assembled upper and sole with the last, after being once set in the machine, may be subjected to the three operations described, namely, the pulling-over, the side lasting and the heel and toe lasting, without removal or detachment of the shoe and by the labor of a single operator. This results, not only in an economy of time, floor space, and labor, but insures a better output of the lasting process, because it throws the entire responsibility for the lasting process upon a single operator, whereas heretofore the need of successive machines and operators increased the likelihood of careless operation and defects because of the difficulty in placing responsibility.

Among the various other objects to which the present invention is directed, is to provide a work-support or "jack" for the shoe to be lasted, which is of a universal character, such as to adapt the machine for shifting the shoe from one posture to another, without detachment from the jack or work-support between the pulling-over operation, the side lasting operation, and the heel and toe lasting operation upon the shoe. By this means the machine is made to effectively coöperate in the performance of the three stated operations upon the shoe, so that the various instrumentalities concerned in the several operations are harmonized or correlated with each other by means of the universal jack referred to. The operations are thus enabled to be performed in quick succession, so that any reheating or softening of the toe of the shoe is dispensed with, such as would be necessary with a lapse of time due to transfer from one machine to another. A high degree of pliability is necessary for the final lasting, and would be lost by any substantial delay between the pulling-over and lasting operations.

A further object of the invention is to so constitute the mechanisms as to adapt them to performing the lasting operations upon either a right shoe or a left shoe, in a simple, convenient and rapid manner, and without either requiring the removal of the shoe from the jack, or a movement of the operator from his original position in front of the machine.

A further object of the present invention is to provide wiper-plate mechanism, such as to permit the independent adjustment of the wiper-plates toward or from each other.

A further object of this invention is to effectively perform correct and uniform lasting of shoes, either rights of lefts, without the need of employing nails or tacks or similar temporary securing means for the upper, during the preliminary operations. Specifically, it is an object to secure this result by the provision of a novel clamping means, adapted to be brought into effect after the shoe has been positioned on the jack, and preferably after the first or pulling-over operation thereon, this clamping means being of such character as to remain in engagement with the shoe to hold it firmly connected to the last throughout the shifting movements and lasting operations upon the shoe, and adapted further to positively hold the shoe upper and toe cap in true position upon the last. This portion of the invention obviates any impairment of the alinement of the toe cap during the final lasting operation as is apt to occur when merely tacks are employed for the temporary securing of the upper.

Other and further objects and advantages of the present invention will appear during the hereinafter following description, and further advantages will be apparent to those skilled in the art.

To the attainment of the above referred to objects and advantages, the present invention consists in the novel machine, mechanisms, combinations, devices and arrangements illustrated or described in the accompanying drawings and specifications.

By way of illustration I will first describe a lasting machine constructed in a way to embody the present invention, and will thereafter point out the novel features in the appended claims.

Figure 14:
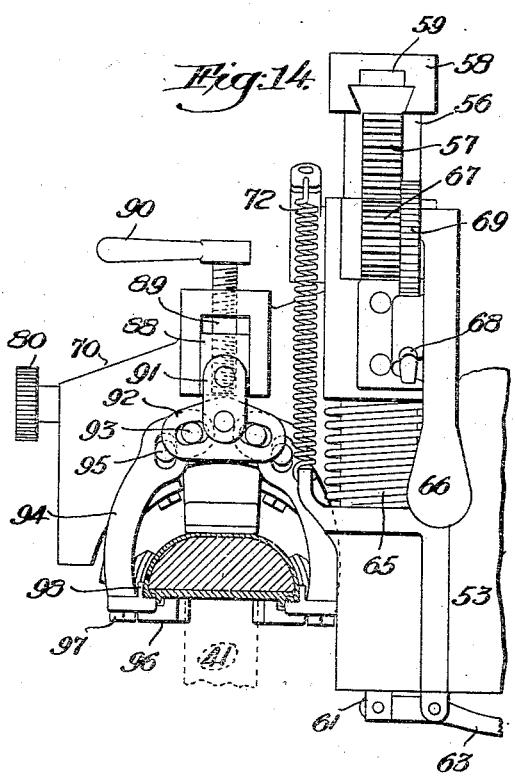
Figure 15:
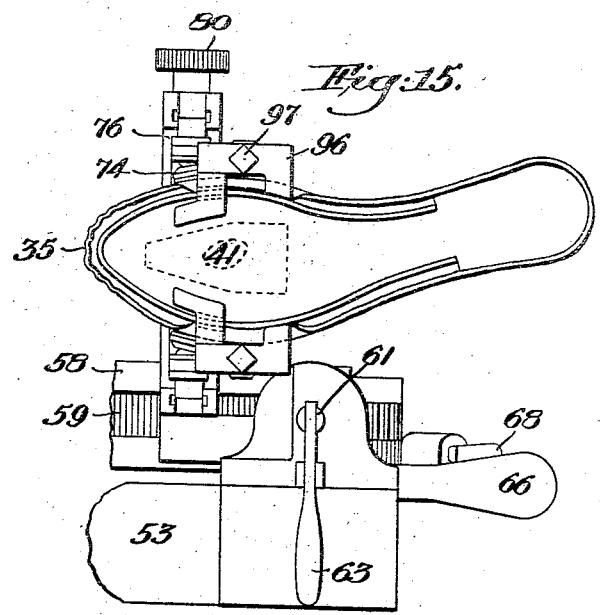

In the accompanying drawings forming a part thereof, Figure 1 is a complete front elevation of a lasting machine embodying the present invention. The parts are shown in their position after the pulling-over operation and after the clamp has been closed, but before any shifting of the jack. Fig. 2 is a left side elevation of the machine shown in Fig. 1. Fig. 3 is a plan view of the machine shown in Figs. 1 and 2. Figs. 4 to 10 refer particularly to the shoe-supporting jack. Fig. 4 is a left elevation of the jack showing a shoe clamped thereon, and held in pulling-over position. Fig. 5 is a front elevation of the parts shown in Fig. 4, that is, looking at the righthand side of Fig. 4. Fig. 6 is a left elevation similar to Fig. 4, but with the jack shifted so that the shoe stands in the proper posture for the side lasting operation. Fig. 7 is a front elevation of the parts seen in Fig. 6, that is, looking at the righthand side of Fig. 6. Fig. 8, in left elevation, shows the jack mechanism again shifted to heel and toe lasting position. Fig. 9 shows a front elevation of the parts seen in Fig. 8, that is, looking at the righthand side of Fig. 8. Fig. 10 is a top plan view of the parts seen in Figs. 8 and 9. In these three figures the shoe is bottom side up, with the heel to the operator's right hand, and the toe to his left. Fig. 11 in left elevation, shows the devices carried by or with the jack, for clamping or retaining the shoe in fixed position relatively to the jack, the same for convenience of illustration, being tilted into upright position. Fig. 12 shows the same parts partially in cross-section, upon the plane 12—12 of Fig. 11. Figs. 13 to 15 refer to a modified form of shoe-clamping device. Fig. 13 is a left elevation of the modified clamping devices shown in pulling-over position. Fig. 14 is a front elevation of the parts seen in Fig. 13, that is, looking from the righthand side of Fig. 13, with the shoe itself shown sectioned to more clearly illustrate the construction. Fig. 15 is a top plan view of the mechanism shown in Figs. 13 and 14, but adjusted into the final or heel and toe lasting position, the shoe being bottom side up. Figs. 16 to 18 refer particularly to the pulling-over mechanism. Fig. 16 is an enlarged left elevation of the pulling-over mechanism shown in the preceding figures. Fig. 17 is a front view of the parts shown in Fig. 16, looking in the direction of the arrow 17. Fig. 18 is an enlarged detail view of a gripper-controlling member. Figs. 19 to 29 refer more particularly to the heel lasting mechanism. Fig. 19 is a front elevation of the heel lasting mechanism. Fig. 20 is a top plan view thereof, with certain upper parts removed. Fig. 21 is a plan view of the heel wiping devices themselves, with a part of their actuating mechanism. Fig. 22 is a plan view of the heel wiper plates detached. Fig. 23 is a plan view of the heel wiper-plate carrier detached. Fig. 24 is an enlarged perspective view of one of the wiper-plate operating cams. Fig. 25 is a top plan view of part of the heel clamping mechanism which is associated with the heel-wiping devices. Fig. 26 is a vertical section taken on the plane 26—26 in Figs. 1 and 19. Fig. 27 is a top plan view similar to Fig. 25, but showing the parts in heel clamping position. Fig. 28 is a detail view of certain parts seen from the righthand side of Fig. 25. Fig. 29 is a section taken on the plane 29—29 of Figs. 27 and 28. Figs 30 to 33 refer to the toe lasting mechanism. Fig. 30 is a front elevation. Fig. 31 is a top plan view of the mechanism at the right hand of Fig. 30, with the top cover plate removed. Fig. 32 is a vertical section taken on the plane 32—32 of Fig. 30. Fig. 33 is a vertical section taken on the broken plane 33—33 of Fig. 31.

The same reference numerals refer to corresponding parts in the several figures.

The illustrated portions of the partly constructed shoe are the upper 35 and the sole or insole 36, the wooden last being inclosed between them.

The several component mechanisms, which together make up the complete machine of this application, are shown in a general way and in their coöperative, relative positions in the assembled views, Figs. 1, 2 and 3. The relative arrangement of the different mechanisms will first be described on these figures and subsequently the structure and operation of the respective mechanisms will be separately described, and finally the operation of the machine as a whole showing the coöperative action of the several mechanisms.

The machine and its operation are such that the operator may stand in place throughout the lasting process on each shoe, namely, in a position standing directly in front of the machine, facing the center of the machine and the shoe held therein, from which he may reach by hand or foot the various controlling levers, wheels, etc.

The main frame or body or base 37 of the machine is shown as provided with an upstanding bracket 38 at the rear which supports the pulling-over mechanism, a high bracket 39 which supports the control levers for the pulling-over mechanism, and an upstanding bracket 40 near the right-hand side for carrying the work supporting mechanism or jack. Other fixed parts and frame parts in the machine will be hereinafter referred to in detail when describing the associated mechanism. It should here be mentioned that sometimes a frame part or fixed member may be employed for giving initial support to the shoe during the pulling-over operation; and such a member 41 is shown in the modified structure Fig. 16, although in the principal embodiment the shiftable work support or jack is made use of for this purpose. The initial posture of the shoe is upper side on top with the toe pointing from the operator and at a higher level than the heel, giving a convenient slant as seen in Figs. 1 to 3, in which the operator has a complete view of the toe portion of the upper during the pulling-over operation.

The locus of the shoe when first placed in the machine and during the pulling-over operation is at the upper central part of the machine in front of the operator as seen in Figs. 1 to 3. The shoe, moreover, preserves this convenient locus throughout the different postures which it assumes at different stages of the lasting process. This advantageous result, serving to keep the shoe always at the same angle and distance from the operator's eye, is attained by the novel jack construction, later to be described.

The pulling-over mechanism 42 is, seen in Figs. 1 to 3, to be located generally to the rear of and beneath the locus of the shoe, supported on brackets 38 and 39. The shoe upper, in its original unstretched condition, stands out from the sides and point of the toe and the function of the pulling-over mechanism is to grip the edges of the upper at the forward extremity and at the sides of the toe and pull or stretch it downwardly, in a general direction at right angles to the sole of the shoe so as to cause the material of the upper to skirt or hang below the last and sole throughout the periphery of the shoe. This operation is an extremely delicate one requiring close observation and frequently readjustment of the pulling-over grippers and correcting operations thereof to secure perfection and symmetry in this important preliminary step of the lasting process. It will be seen that the locus and posture of the shoe and direction and action of the pulling-over mechanism 42 conduce to these results. The details of the pulling-over mechanism are shown in Figs. 16 to 18.

After the pulling-over operation there comes into play the jack mechanism 43, which is carried by the bracket 40 and may constitute the shoe support during the pulling-over. Associated with or forming part of the jack mechanism 43 is a clamping mechanism 44 adapted, after the pulling-over is completed, to engage on top of the shoe upper and press and clamp it firmly against the last opposed by the shoe rest of the jack, and to continue this clamped condition of the shoe throughout the subsequent shifting movement of the jack and shoe and the remainder of the lasting process. Preferably the jack has two successive shifting movements, the first serving to merely turn the shoe about a horizontal axis, thereby inverting it and holding it with the toe pointed toward the operator, in which position the side lasting operation is conveniently performed; the second shifting movement of the jack serving to turn the shoe about a vertical axis until it stands in its final or heel and toe lasting position with the heel at the right and the toe at the left of the operator. The jack mechanism is shown in different adjustments in Figs. 4 to 10; the details of the clamp in Figs. 11 and 12 and a modified form of clamp in Figs. 13 to 15.

The heel lasting or wiping mechanism 45 is shown located generally at the right hand side of the machine in position to coöperate with the shoe in its aforesaid final posture while held in the jack. The details are shown in Figs. 19 to 29. Similarly the toe lasting or wiping mechanism 46 is located generally to the left hand side facing the toe of the shoe when held in the final jack position. The details are shown in Figs. 30 to 32.

It will be convenient to describe the jack mechanism and the clamp mechanism before describing the pulling-over and lasting mechanisms. The jack mechanism, designated as a whole by the reference 43, is primarily supported on the upstanding bracket 40. The upper end of the bracket 40 forms a bearing for a horizontal fulcrum shaft, seen dotted in Figs. 1 and 3. This shaft extends from right to left and forms a pivot for the main jack arm 51, which is preferably integral with the shaft, and from the end of the shaft is curved first upwardly and then rearwardly and then leftwardly in Figs. 1 to 5. Its extremity is directly over the locus of the shoe, and is there provided with a vertical fulcrum shaft or pivot 52 to which is secured a secondary or smaller jack arm 53, which extends downwardly in a curved manner to the shoe supporting position or locus. From the enlarged extremity of the jack arm 53 extends a shoe rest 54 which, as will be seen, is in such a position as to support the shoe in the jack at a point substantially in line with both of the fulcrum shafts 50 and 52 so that the swinging of either jack arm about either axis merely shifts the posture of the shoe without substantially changing its locus in the machine.

The shoe rest 54 is fitted to the jack so as to permit the shoe to take its initial inclined posture as shown in Figs. 1 to 7, or to permit it to be swung into a horizontal posture as in Figs. 8 to 10. To this end the shoe rest is formed with a short horizontal fulcrum shaft 55 by which it is pivoted to the jack arm 53. The swinging of the fulcrum shaft and the shoe rest is effected through an upstanding arm 56 secured at its lower end to the shaft 55. One edge of the arm 56 is provided with teeth 57 for a purpose which will be explained. The top end of the arm is shaped to engage and fit the undercut groove formed at the lower side of a curved segment piece or guide 58, rigidly secured to the jack arm 53.

The shoe may be shifted by hand to any desired angle with respect to the jack by the means just described, and may be secured in any adjustment by a locking device between the arm 56 and the segment 58. For example, the segment may have a toothed rack 59 within its undercut groove adapted to be engaged by a vertically sliding toothed head 60 (see Fig. 12). The toothed head 60 is formed at the extremity of a sliding rod 61 and is pressed outwardly by a spring 62 so as to normally hold the shoe rest locked. The other extremity of the rod 61 is connected to a small lever handle 63 which the operator may press to effect the unlocking of the device 59—60 during any adjustments of the posture of the shoe.

The arm 56 by which the shoe rest is rocked and is secured in its different adjustments, is also used for supporting the shoe clamping mechanism 44. The arm is shown as surrounded by a sliding sleeve 64 which carries the shoe upper clamping member. The sleeve 64 is adapted to move up and down on the arm, a spring 65 tending to lift it for opening the clamp, and it being depressed by a handle 66 by coöperation with the teeth 57 on the arm 56. The handle 66 is pivoted to the sleeve 64 and at its fulcrum is provided with a pinion 67 engaging the rack 57 of the arm 56. Referring to Fig. 11, it will be seen that depressing the handle to its lowest position serves to move the sleeve downwardly on the arm, thereby closing the clamp upon the shoe upper, whereas raising the arm serves to open the clamp. A spring pressed pawl locking device 68 on the handle 66 serves to secure the handle in its locked position by coöperation with a toothed rack 69 until the pawl is released by the operator.

The shoe clamp 70 itself is not rigidly secured to the sleeve 64 but is pivotally mounted therein by the fulcrum or stud 71 which permits the clamp to be swung between the clamping position seen in Figs. 2, 4, etc., and a withdrawn position shown in dotted lines in Fig. 11 in which it gives a clear view of the pulling-over operation. A spring 72 tends always to swing the shoe clamp outwardly to inoperative position and it may be swung backwardly into clamping position by hand prior to the throwing down of the locking handle 66.

The shoe clamp 70 in its operative position overhangs the shoe rest 54, as best seen in Fig. 12, and the clamp at its lower side is generally concave, being shaped to accommodate a plurality of clamping pads 73, 74 constituted of such material as to avoid injury to the shoe. The central clamp pad 73 is shown rigidly secured to the clamp and its shoe contacting surface is provided with a resilient material 75. The side clamp pads 74 are mounted in ball and socket joints at the ends of a pair of spring arms 76 which, in turn, are mounted upon adjustable segment-shaped carriers 77 which are adapted to slide in arc-shaped grooves in the clamp 70 and are toothed at their inner edges. This structure is for the purpose of adjustment. Journaled to the shoe clamp and meshing with the toothed segments 77 are a pair of actuating pinions 78 which, in turn, mesh with the oppositely threaded portions of a worm shaft 79 which at its exterior extremity has an adjusting wheel or thumb nut 80. By turning the adjusting wheel 80 to right or left the side pads 74 are caused to circularly approach or recede from the center pad 73. This enables adjustment of the clamp to different shoes.

The bodily swinging movements of the clamp 70 between operative and inoperative position are limited by stops. Thus a stop shoulder 81 on the body of the clamp 70 meets a fixed shoulder 82 on the sleeve 64. The outstanding rib or web 83 of the sleeve forms an abutment for the body of the clamp when swung into operative position. It is important that the clamp when in clamping position be held rigidly against any possible play or side movement and to this end the web 83 is provided with an undercut groove 84 (see Figs. 11 and 12) which is engaged at times by a corresponding dove-tail projection or rib 85 on the clamp. When the clamp is swung inwardly to clamping position, the projection engages the groove and gives the desired solid support to the clamp.

When the shoe has been clamped by the clamp 70 upon the shoe rest 54 it is very desirable that it shall not be disturbed during subsequent shifting movements and operations. To this end the shoe rest is provided with one or more upstanding points 86 adapted to stick into the sole of the shoe for preventing slippage. In order that these points may not disfigure the shoe during the act of adjusting it into place the points are protected by a flat resilient member or spring 87. Normally the member 87 stands slightly above the level of the shoe rest, as seen in Fig. 11, thus acting as a guard for the points, but when the shoe is clamped into place the guard member is depressed upon the shoe rest causing the shoe points to protrude through the guard and into the sole of the shoe.

A modified shoe upper clamping mechanism is illustrated in Figs. 13 to 15. In these views the machine is shown as provided with a stationary shoe rest 41 which may be carried by the bracket 38 which carries the pulling-over mechanism. This rest is intended to be used merely to support the shoe during the pulling-over and clamping operations. Being stationary it is incapable of affording an abutment to oppose the clamp throughout the shifting of the shoe. Therefore, the modified clamp is provided not only with the clamp parts above the upper, as shown in Figs. 4 to 12, but with other parts which reach below the shoe and engage the shoe sole in opposition to the first mentioned parts.

As compared with the first described clamping mechanism the modified mechanism differs in the following respects. The clamp body 70 is slightly enlarged so as to accommodate a longitudinal slideway for a slide or block 88 adapted to move up and down in the operation of adjusting the underreaching clamp parts into and out of place. Block 88 is provided with a threaded recess at its upper side engaged by the threaded lower end of a rod 89, said rod having at its upper end an oppositely threaded portion engaging a correspondingly threaded recess in the clamp body portion. A handle 90 at the upper end of the rod may be turned for throwing the block 88 up and down.

The connections from the block 88 to the underreaching clamp portions comprise a link 91 which pivotally connects the block to a slotted head 92. The slots at the sides of the head 92 engage with studs 93 formed at the upper ends of levers 94 which swing about sliding pivots 95. The lower ends of the levers 94 are provided with inturned hook-like extensions, or feet 96 loosely connected to the levers by pivots 97 so that the feet may readily adapt and position themselves to conform to the shape of the shoe, this operation being assisted by the presence of upstanding positioning ribs 98.

Normally the underreaching clamp feet 96 stand wide-apart. When they are swung with the clamp for the purpose of clamping the shoe, the feet extend under the shoe. By turning the handle 90 so as to raise the block 88 the described construction, as best seen in Fig. 14, causes first the inswinging of the levers 94 to bring the feet 96 snugly against the sides of the shoe, the continued lifting movement serving to pull upwardly the levers with the feet until the shoe is firmly clamped between the overlying and underreaching clamp members. The stationary shoe support 41 and the underlying clamp feet 96 are so relatively shaped as not to conflict with each other nor with the lasting operations.

This finishes the description of the jack and clamp mechanisms. Figs. 1 to 5 show them in initial or pulling-over position, after the clamp has been applied to the shoe. When the jack and clamp are swung to bring the shoe to side lasting posture the parts assume the position shown in Figs. 6 and 7. This swinging takes place about the horizontal fulcrum and serves to invert the shoe. When subsequently swung about the vertical fulcrum 52 to bring the shoe into heel and toe lasting posture, the parts assume the position shown in Figs. 8, 9 and 10, also shown in Fig. 15, the shoe at this time having been swung further about the fulcrum 55 to bring the shoe into a more nearly horizontal posture. As these shifting operations are performed by hand it is desirable to minimize the effort required and to this end the weight of the jack arms 51 and 53 and connected parts is shown as counterbalances by means of a counter-weight 99 secured below and rigid with the horizontal fulcrum shaft 50 (see Figs. 1, 2 and 3).

The upward swinging movement of the jack arm 51 is limited by means of a stop device comprising a stop contact 100 on the jack arm 51 engaging a fixed projection 101 from the bracket 40. When inverted the jack is brought to proper position by means of a stop projection 102 which, when swung downwardly, enters a socket provided at 103 in a member 104 secured to the base 37 of the machine. This not only properly stops the swinging movement of the jack but it positions its lower end and at the same time holds the jack rigidly in place during the lasting operations.

The pulling-over mechanism, shown generally in Figs. 1, 2 and 3, will now be referred to in detail with additional reference to Figs. 16, 17 and 18. The main portion of the mechanism is carried on the upstanding bracket 38, and the overhead control levers are carried on the bracket 39. This mechanism comprises a number of pincers or grippers, which normally stand in open condition advanced to the point where the shoe upper may be engaged with them when positioning the shoe in the machine. Combined with the grippers is mechanism for closing the grippers upon the material of the shoe, and for locking them in closed position, and for withdrawing them, so as to stretch the material and pull it over the toe of the shoe, and for relatively varying the actions of the several grippers during the pulling-over operation, and for finally reopening and restoring the grippers to the original position; there being also various adjusting means.

In all five grippers are shown, a toe gripper 110, and at each side of the toe a pair of side grippers 111. The five grippers are substantially alike. Fig. 16 shows them in both side and end views, and the description may be confined to that figure.

The gripper 110 is carried at the end of a rod 112 and each gripper 111 at the end of a rod 113. The rods are slidable upwardly and downwardly in boxes 114, the rods 113 being arranged in pairs in double boxes. These boxes 114 are pivotally mounted on the bracket 38 for purposes of adjustment as will be later described.

Each gripper rod 112 or 113 is at its upper end somewhat enlarged to afford a head. On this head is provided a pivot for the movable gripper member 115. The extremity of the gripper member is formed into a suitable gripping surface, being preferably serrated. It is adapted to swing toward and close upon a co-acting gripper member 116, which is fixedly secured to the rod, but capable of slight yielding under forcible pressure.

Each movable gripper member 115 is provided with a curved extension or tail 117 formed to act as a cam during the closing of the gripper. A spring 118 pulls upon the gripper tail and tends to open the gripper. For closing the gripper the head of the gripper carrying rod is provided with an operating lever 119 pivoted near its middle to the rod head and having a roll at its extremity coöperating with the cam shaped tail 117 of the movable gripper jaw. Swinging the lever to move the roll downwardly throws outwardly the gripper tail and causes the closing of the gripper. The lever 119 is provided with a notched extension or tail 120. Forcing this tail upwardly closes the gripper. A spring lock or arm 121 serves to lock the parts in such position; the spring lock causing the pin of the lock to pass out of the notch of the lever. To open the gripper it is only necessary to depress the lock arm against its spring which permits its pin to again drop into its normal position in the notch of lever 119. By this arrangement a very simple gripper control is secured. A pressure on the lever 119 closes and locks the gripper, while the pressure on the lock arm 121 unlocks the gripper, which is thereupon opened by the spring 118.

To effect the opening and closing of all of the five grippers simultaneously a control device may be conveniently employed in the form shown in the figures, (see particularly Fig. 18), comprising a control piece or head 125 carried by a control rod 126. The control piece 125 has three extensions which are adapted to coöperate with the several levers 119 and the several lock arms 121 of the gripper devices. The rods 126 are longitudinally slidable in the body of the pulling-over mechanism and are adapted to be moved upwardly and downwardly between three positions. Figs. 16 and 17 show the initial or normal position, in which the control device is inoperative. When forced upwardly to the extreme limit of its movement it serves to contact and raise the notched tail of the lever 119, causing the gripper to close, the lock arm 121 swinging outwardly to lock the parts in closed position. The control device has also an intermediate position, in which it is inactive, the position of the control piece 125 being such that it does not contact either the lever 119 or the arm 121 during the pulling-over movements of the gripper. The control piece on its return movement to normal position strikes and depresses the lock arm 121, thereby releasing the lever 119 and permitting the gripper to open and the notch of the lever to engage the pin of the arm, as seen in Figs. 16 and 17.

While the gripper opening and closing might be controlled from various sources, I have illustrated a pedal. The connections may be as follows: The control rod 126 extends downwardly through the bracket 38 projecting below to the rear of the bracket, (as seen in Fig. 2), and extending to a suitable bearing 127 on the base, where the rod has a sliding fit. By a pin and slot connection 128 the rod is connected to the rearwardly extending arm 129 of a bell crank lever whose upwardly extending arm 130 is connected by a link 131 with the upwardly extending arm 132 of a second bell crank, whose forwardly extending arm 133 constitutes a control pedal.

A spring 134 tends to hold the pedal elevated and the rod 126 depressed, and thereby the grippers in open position. By depressing the pedal from its illustrated lifted position to its completely lowered position the rod 126 is raised to effect the closing and locking of the grippers. It has been explained that the control rod should stand in an intermediate position during the pulling-over operations so as to not interfere with or cause release of the grippers. This result may be attained by a latch device for holding the pedal 133 in an intermediate position. A latch lever 135 (see Figs. 1 and 2) is pivoted to the base at its lower end and is provided with a hook 136 adapted to hook over and hold down the treadle lever 133. The latch lever is connected by a link 137 to a tripping lever 138 centrally pivoted to the base as shown, and a spring 139 is arranged to pull upon the link and lever so as to hold the latch in its effective position. The operator thereby has merely to depress the lever to close and lock the grippers and to release it, when it comes up against the hook 136, remaining there during the pulling-over operation, whereupon the operator may lightly kick the lever 138 to the left, thus throwing out the latch and permitting the pedal 133 to rise, thus depressing the rod 126, opening the grippers, and restoring the parts to original position.

The upward and downward movement of the toe gripper and the grippers at either side may be effected in different ways, but I prefer separate control levers. The connections between the toe gripper carrying rod 112 and its lever are somewhat different from the connections for the other grippers and will be separately described. A collar 141 is adjustably secured on the rod 112 beneath the box 114, forming a stop for the upward movement of the gripper and affording means of attaching a spring 142 which tends always to lift the gripper into its upward or normal position. For forcibly depressing the gripper to stretch or pull over the material of the shoe upper, the following connections may be employed. The rod 112, by a pin and slot connection 143, is pivoted to a lever 144, the lever being centrally journaled to a bracket 145 projecting from the bracket 38. The lever 144 is connected by an upwardly extending link 146 to a generally horizontal lever 147 journaled upon a pivot shaft 148 at the top of the high upstanding bracket 39 of the machine. The lever 147 is extended forwardly beyond its pivot in the form of a handle 149 which is in easy reach of the operator. It will be seen that by pulling down on the handle 149 the toe gripper is pulled forcibly downward.

The mechanism for pulling down the side grippers 111 at the two sides of the toe preferably comprise first a pair of independent hand levers by which the two sides may be independently pulled under the observation of the operator to insure symmetry in the pulling-over operation and a powerful foot lever which simultaneously pulls down the grippers at both sides for the final stretching at this point of the shoe, which operation may be performed in conjunction with the pulling-over by hand at the extreme front of the toe by means of the already described connections for the toe gripper 110.

Referring back to Figs. 16 and 17, the side gripper rods 113 of each pair are shown as being linked at their lower ends to the extremities of a short equalizing lever 150 from the center of which extends a link 151 which connects at its lower end by a slotted pivot connection 152 with a lever 153 which is fulcrumed at 154 to a block 155. The described devices are symmetrically arranged at both sides of Fig. 17.

From a median point in each lever 153 extends downwardly a connecting rod 156. These two connecting rods (see Fig. 2), extend downwardly to where they have a sliding ball engagement with a cylindrical socket in the bearing piece 127 on the base. Each of the rods 156 has a slotted pivot connection 157 with a rock arm 158 fast on a rock shaft 159 fulcrumed in the base, so that any turning of the rock shaft simultaneously actuates both of the rods 156 and, therefore, all of the side grippers. The rock shaft 159 has a forwardly extending arm 160 which connects with the rear extension of a pedal lever 161. With this arrangement depression of the pedal 161 causes depression of both rods 156 and the simultaneous pulling down of all of the side grippers 111.

For independently pulling-over or adjusting the two sides of the upper by hand levers the following connections may be employed. Reverting back to the levers 153 in Figs. 16 and 17, it will be seen that the blocks 155 act as fulcrums when pulling over by the pedal 161 just described. When pulling over by hand the pedal connection 156 forms the fulcrum and the blocks 155 are raised to pull down the grippers. For this purpose the blocks 155 are constructed to constitute slides movable upwardly and downwardly on slideways 162. Each slide block 155 has a pivotal connection with a lever arm 163 pivoted to a bracket 164, the lever having a second arm 165 which is connected by an upwardly extending link 166 (see Fig. 2) with a lever 167 fulcrumed on the same previously mentioned fulcrum shaft 148 at the top of the high upstanding bracket 39. The lever 167 has a forward extension forming a handle 168 at the front which may be conveniently grasped and compressed. Since there is a handle 168 for the grippers at each side, the grippers are independently movable. In the preliminary pulling-over operation, the operator may work both the handles 168 while observing the shoe until the upper has been evenly and symmetrically stretched at the two sides. At this time the hand levers are adapted to become locked so as to hold the parts, including the fulcrum blocks 155, in position during the subsequent pedal controlled pulling-over operation. To this end each handle 168 is provided with small lock lever 169 pivoted to the handle and serving, through a small bell-crank 170, to unlock a toothed locking device 171 which is normally held locked by the lock lever spring. Thus the operator may at will adjust the two side levers 168 for the pulling-over operation or may release and restore them preparatory to operations on another shoe.

In order to permit initial relative adjustment of the grippers to suit the dimensions of a given batch of shoes to be pulled-over, the following adjusting devices may conveniently be employed. To permit adjustment of the toe gripper 110 toward and from the shoe the box or slideway 114 of the gripper carrying rod 112 may be pivoted at 176 to a fixed portion of the bracket 38. This allows a slight swinging of the gripper rod and gripper, which is permitted to be done without disturbing the operating connections, by reason of the slotted connection 143 previously referred to. To control the swinging adjustment of the box it is provided with a socket at 177 engaged by the enlarged end of an adjusting screw 178, the threaded portion of which engages a threaded recess in the bracket, said screw having an accessible nut or wheel 179 by which the screw may be turned for swinging the gripper into the desired position.

A somewhat different adjusting mechanism is provided for the side grippers 111. The boxes in which the carrying rods 113 slide are symmetrically pivoted at 180 at opposite sides of a lug 181 projecting from the bracket 38. The swinging of the boxes about the pivots 180 is permitted by the slot connection 152 previously described. To effect the swinging adjustment of the boxes each of them is provided with a link 182, these links extending to a central head 183 which is adjustable up and down. This head is slotted to accommodate the before mentioned adjusting screw 178. The head 183 is slidable upon a guide 184 on the bracket 38. Engaged with an outstanding lug 185 of the head 183 is an adjusting screw 186 which also passes through the fixed lug 181, having a pair of collars to prevent endwise movement therein. The thumb nut or wheel 187 at the extremity of the screw permits hand adjustment thereof so as to move the head 183 up and down and thereby through the links 182 swing the grippers slightly one way or the other, as desired.

The operation of the pulling-over mechanism will now be understood. It is assumed that the pulling-over mechanism including the grippers have been properly adjusted for a given batch of shoes. The adjusting means have been described and are quickly manipulated to set the parts to match the dimensions or style of the shoes to be lasted. The operator having positioned the shoe upon the shoe rest with the margin of the upper between the several gripper jaws, depresses the pedal 133 to its lowermost position. This causes the closing of the grippers and their locking in closed position. Upon releasing the pedal it rises to its intermediate position in which it leaves the grippers closed throughout the pulling-over operation. The operator may then manipulate the pulling-over pedal 161 and the pulling-over handles 149, 168, 168 in any manner that expedience may dictate. For expedience the operator may first simultaneously operate the pedal and the central hand lever 149, or may actuate first one and then the other as he observes the effect upon the toe cap. During the pulling-over operation unequal stretching of the leather may occur, especially at the sides, and this the operator can quickly compensate for by the side levers 168. These levers are independently movable to secure proper symmetry and accurate alinement in the pulling-over operation. Each of the side levers when thus pulled down to secure proper alinement becomes locked so that the final pedal pulling operation may be properly performed in coöperation with the central lever 149 in completing the pulling-over operation. The two side grippers constituting each pair are caused to equally stretch the leather at one side by reason of the equalizing lever 150 forming part of their mutual connections. The completion of the pulling-over operation is followed by the clamping operation by which the upper is forcibly pressed against the last above the shoe rest. This operation has already been described. This operation connects the shoe with the jack so that all the subsequent shoe shifting improvements are effected by adjustment of the jack as described. As soon as the shoe clamp has been properly applied in the manner explained, the shoe must be disengaged from the pulling-over mechanism, which is done merely by the operator kicking the lever 138 which effects the opening of the grippers. The pedal 161 and the levers 149 and 168 which may have been held down up to this point, should now be released and returned to normal position. The machine and the shoe are now ready for subsequent operations, namely, the side lasting operation and the heel and toe lasting operations. To bring the shoe into its side lasting posture, the jack is simply swung about its horizontal fulcrum 50. This inverts the shoe from the posture shown in Figs. 4 and 5 to the posture shown in Figs. 6 and 7, the toe of the shoe being now generally toward the operator. The side lasting may now be performed by any desired appliances, and the side or shank of the shoe upper secured in place around the sole. The operator may first side last one side of the shoe and then the other swinging the shoe around about its vertical fulcrum 52 into different angular position as desired. To bring the shoe to its final posture, the vertical fulcrum is employed, the jack arm 53 being swung by hand until the parts assume the adjustment as shown in Figs. 8, 9, 10 and 15. The heel of the inverted shoe now stands at the right of the operator and the toe at the left. The machine is now ready to bring the heel lasting or wiping mechanism 45 and the toe lasting or wiping mechanism 46 into operative position. Figs. 1 to 3 show the general position of these two mechanisms and their relation to the other mechanisms of the machine. Since it is preferable to effect the lasting of the heel prior to the lasting of the toe, the heel lasting mechanism will be first described.

The heel lasting mechanism shown generally in Figs. 1 and 3, and in detail in Figs. 19 to 29, is carried firmly but adjustably upon the base 37 of the machine by means of a solid upright shaft or stem 200 of large diameter, fitting within a socket 201 in the base. This device affords a bearing or vertical axis directly beneath the shoe for the purpose of swinging the heel lasting mechanism forwardly or rearwardly. From the top of the stem 200 extends toward the right, a heavy swinging arm 202, the upturned extremity 203 of which constitutes a hollow head or base upon which the heavy lasting mechanism is supported.

The wiping devices or plates forming part of the lasting means and the heel clamping means coöperating therewith, are borne not directly on the hollow head 203, but upon the top carriage of a series of carriages which are interposed between the head and the wipers. The carriages of this series are relatively movable or adjustable in different ways, so as to afford universal adjustment of the heel lasting mechanism, to permit it to be properly positioned with relation to shoes of different size, shape and style. These carriages will first be described, by reference to Figs. 1, 19 and 26. The first carriage 206 supported by the hollow head 203, is relatively movable or adjustable in two modes. It may be lifted and dropped, or it may be rotated. The first carriage 206 has a cylindrical downward extension 207 located within the cylindrical interior of the head 203, the head thus forming a bearing for the rotation of the carriage. In order to effect rotary adjustment, the carriage is provided with a worm wheel 208, connected by a spline 209 with the carriage so as to permit up and down movements of the latter. A down-hold 210 is employed to hold the worm wheel in place. The worm wheel is acted upon by a worm upon a worm shaft 211, see Fig. 1, which may be rotated at will by hand wheel 212. Thus the operator by the use of the wheel may turn the entire heel lasting mechanism about its central vertical axis.

In order to effect lifting and lowering adjustment, the first carriage 206 has its downward extension 207, interiorly threaded to receive a screw 213. The screw may be turned by means of a worm wheel 214 at its lower end, this being confined by a holddown or plate 215 located within the hollow head 203. The worm wheel is actuated by a worm upon a shaft 216 having an easily accessible hand wheel 217 for turning, whereby the operator may readily effect any desired height adjustment of the lasting mechanism. This brings us to the second carriage 220 supported directly above the first carriage. The second carriage constitutes an arc shaped slide for giving a circular motion about an axis substantial in the plane of the wiper plates for the purpose of effecting any desired lateral tilt or incline of the lasting mechanism. The sliding connection between the second and first carriages is afforded by curved flanges or feet 221 at the lower part of the second carriage, these feet extending outwardly and resting upon correspondingly curved ribs 222 of the first carriage. Suitable angle plates 223 overlap the curved feet 221 confining them in place. To effect relative sliding between the second and first carriages in order to tilt the former as desired, a worm 225 is mounted in the first carriage, it having an accessible handle or wheel 226 for turning it, and the worm engages with the teeth of the curved rack 227 at the lower side of the second carriage.

Above and supported upon the second carriage 220, is the third carriage 230. The fittings between the second and third carriages are similar to the fittings between the first and second carriages, but are placed at right angles, so that adjustment of the third carriage varies the longitudinal tilt or incline of the wiping mechanism. The third carriage has curved feet or flanges 231 at its lower side bearing upon the curved upper surface 232 of the second carriage, and confined by angle plates 233. The worm 235, turned by an exterior hand wheel 236, engages the teeth of a curved rack 237 on the third carriage. The operator by the means of the hand wheel varies the longitudinal tilt as desired.

The described connections between the head and the first, second and third carriages afford bodily swinging, rising and falling, and lateral and longitudinal tilt, but not any bodily movement of the wiping mechanism toward and from the shoe. This is provided by the fourth carriage.

The fourth or topmost carriage 240 of those between the base 203 and the wiping mechanism, directly carries the heel lasting or wiping plates, and also the device or clamp which contacts the sides and end of the heel during the wiping operations.

The fourth or top carriage 240 is fitted to the third carriage by a simple horizontal groove and tongue sliding connection 241, arranged in a direction to permit the top carriage to be advanced toward the shoe, that is to say, leftwise in Fig. 1, or retracted. Sliding movements of the top carriage may be affected through the underneath teeth of a rear extension or rack 242, which is engaged by pinion 243 journaled on the third carriage 230, and capable of being rotated by a hand wheel 244. The operator, by turning the hand wheel counterclockwise, is able to forcibly advance the top carriage with the heel clamps and wiper plates toward the shoe.

In order to lock the top carriage so that the operator will not be required to retain hold of the hand wheel 244 during the wiping operation, the following lock device may be employed. The top side of the rear extension 242 of the top carriage is provided with a series of teeth 245 adapted to be engaged and held by a hooked latch lever 246, which drops into place upon the completion of the forward adjustment of the carriage. This latch lever swings about a cross shaft 247 supported on the carriage, and a spring 248 tends always to hold the hook in engagement with the teeth. The latch lever has a forward extension or tail 249 which serves the purpose of automatically unlatching the top carriage to permit its retraction after heel lasting is completed.

The retracting or rightward movement of the top carriage is limited or stopped by means of a pair of lugs 250 formed on the third carriage 230, these lugs also forming the bearings for the stud cross shaft 247 of the latch lever. A long spring 251 is arranged between the third and top carriages, so as to tend to retract the top carriage and move it up to the stop lugs 250 when the latch 246 has been opened.

The fourth or top carriage of the heel lasting mechanism supports the heel clamping devices and above them the heel wiping devices and their actuating mechanism.

The heel clamping devices are seen in Figs. 25 to 29. At the forward end thereof are an end or center clamp pad 253 and a pair of opposed or side clamp pads 254. The heel end clamp pad 253 is carried on a longitudinal slide 255 mounted in a slideway in the carriage 240. A pivot 256 and a spring 257 are provided between clamp member 253 and the slide 255 to permit the clamp to tilt to adjust itself to different shapes of heel. A compression spring 259 is provided within a longitudinal recess in the slide 255, its rear end contacting with abutment 260 upstanding from the carriage 240. This spring tends to hold the slide 255 relatively forward on the carriage, as seen in Fig. 25. The side clamp pads or members 254 are carried on swinging levers 263 centrally pivoted to the carriage 240. Each side clamp pad is yieldingly connected by a pivot 264 and spring 265 to its lever to permit self-adjustment to different shapes of heel.

Each side clamp pad lever has a rear extension or tail 266 bearing a cam roll on its extremity, the same adapted to co-act with opposite cams 267, formed on the slide 255. Springs 268 tend to keep the levers bearing against the cams. With this arrangement obviously any rearward relative movement of the slide 255, that is to say, toward the right in Figs. 1 and 25, will tend to swing the side clamp pads toward each other. The operation is simply that on forcing the carriage 240 toward the shoe, the end clamp member 253 first contacts the heel it then becoming stationary, while the continued advance of the carriage brings about a relative rearward movement of the slide so as to throw the side pads together upon the shoe. By this action, therefore, the three clamp pads are caused to snugly and firmly clamp the heel in place, holding it steady during the heel lasting operation, as seen in Fig. 27. The latch device, already described, locks the parts in shoe clamping position until after the wiping operations are completed, when the wiping handle or lever in its retracting movement strikes the tail of the latch, thus releasing the carriage and permitting the parts, by means of the springs 251, 259, to resume normal position.

Above the heel clamping mechanism just described is a plate portion 270 which confines the mechanism in place and also serves for supporting the heel wiping mechanism about to be described. Spaced above the plate 270 is a second plate or cover 271 which confines a portion of the heel wiping mechanism, as seen in Fig. 26.

Referring now also to Figs. 20 to 24, the wiping mechanism is seen to comprise a pair of opposed wiper plates 272. These plates are relatively movable and, indeed, are structurally separate from the remainder of the mechanism, as will be seen in Figs. 21 and 22, the plates being laid into place and confined by the cover plate 271 above. The wiper plates are moved forwardly and rearwardly by a peculiarly shaped slide bar 273, see Fig. 23, engaging in a slideway 274 formed in the plate 270 beneath. The forward end of the slide is provided with a circular pin or stud 275 with which the circular tails 276 of the wiper plates contact, the latter in turn being contacted by a circular guide wall 277 arranged concentrically on the slide. By this arrangement the plates are forced to advance and retract with the slide. They are, however, capable of swinging independently toward and from each other about a center or axis substantially at the point of the heel. The arrangement also is such as to minimize wear and injury. To move the slide forwardly and backwardly it is provided with an upstanding boss 279 which is connected by a link 280 with a hand lever 281, which may be swung rightward and leftward by the operator to advance and retract the slide.

To cause the swinging of the wiper plates toward each other during their forward movement, and thereby gather the upper snugly in around all sides of the heel, the following connections may be employed. The slide 273 has opposite side extensions 283 to which cam levers 284 are pivoted, having cam rolls 285 at their rear ends. These rolls engage in the underneath grooves of cams 286, see Fig. 24, these cams being fixedly supported in the overlying cover plate 271. The incline of the cam grooves is such as to throw the rolls 285 outwardly when the slide 273 is shifted forwardly.

The cams 286 are preferably adjustably connected to the cover plate. For this purpose each cam is provided with an upstanding stem 287 about which it may be rotated. This stem passes through an aperture in the cover plate 271. At the top of each cam stem is keyed a small arm 288 which extends in a direction parallel to the cam groove and at its extremity has a short concentric groove shown dotted in Fig. 20 and engaged by a bolt 289 by which it can be secured when adjusted. In this way the incline, and therefore the throw, of the cam 286 may be adjusted. The cam levers 284, where they extend beyond their sliding pivots, are connected by short links 291 with the wiper plates at the two sides, respectively.

The operation of this part of the mechanism is merely that after the shoe heel has been properly clamped in the clamping mechanism carried on the heel lasting carriage, the operator, by throwing the handle 281 to the left, simultaneously advances the wiping plates and, by the cam mechanism described, causes them to swing convergingly. This motion serves to bend or wipe the upper snugly around the last and sole simultaneously at all sides of the heel. This lever actuation requires only one hand of the operator, and the process may be assisted by him with the other hand in various ways; for example, by varying the height adjustment by the hand wheel 217. When the margin of the upper has been properly wiped in around the heel and forcibly pressed into shape, it will be permanently secured by tacks or the like.

We come now to the toe lasting or wiping step, and it should first be explained that the parts are so arranged that the toe lasting mechanism may serve as an abutment or support for the toe of the shoe during the heel lasting operation. For this purpose the toe lasting mechanism is provided with a special part or abutment 287 which may be thrown into position after the toe lasting, as will be hereinafter more fully explained. Likewise the heel lasting mechanism may be employed to give support or abutment to the heel of the shoe during the toe lasting process. This result may be secured by simply leaving the heel clamps in clamping position after the completion of the heel lasting operation until the lasting of the toe is completed.

The toe lasting mechanism shown generally in Figs. 1, 2 and 3, is illustrated in detail in Figs. 30, 31 and 32. Referring to Fig. 1, a heavy cylindrical stem 300 of large diameter is shown located within a socket 301, formed in the base 37 of the machine, the stem at its upper end carrying a heavy swinging arm 302 which extends to the left and there carries a head or guideway 303 which supports a succession of carriages, as will be hereinafter described, with the toe wiping plates upon the topmost carriage.

The stem 300 is adapted to be rotated within its socket or bearing 301, so as to cause the swinging forwardly or rearwardly of the arm 302. For this purpose a worm wheel 304 is splined to the stem 300 and is held in place by the downhold 305. The worm wheel 304 is in mesh with the worm of the worm shaft 306 provided at its front end with a hand wheel 307. By the use of the hand wheel, the operator may bodily swing forwardly or backwardly the toe wiping mechanism.

Lifting and falling movements of the wiping mechanism are necessary and it is preferable that these movements should be accomplished during the wiping operation under the control of a foot pedal, so that the operator in performing this delicate work, may have his hands free to manipulate the wiping plates in their inward and outward movements while his foot effects the necessary lifting or lowering thereof. Such a pedal 308 is shown, it being mounted upon a rock shaft 309 extending rearwardly and having secured near its rear end a lever 310 which, in turn is connected by a link 311 with the under side of the stem 300. By this arrangement, depression of the pedal 308 lifts the stem and the toe lasting mechanism. The connection between the link and the stem is such as to permit the stem to be rotated by the hand wheel 307. Since the weight of the parts to be lifted is quite heavy, it is preferred to partially balance them by means of a strong compression coil spring 312 located directly beneath so as to press upwardly upon stem 300. This spring also acts as a cushion to prevent injurious impact in restoring the parts to normal position.

Coming now to the mechanism supported on the swinging arm 302, the first movable element is what may be termed the first carriage 314, Figs. 1, 30 and 32. This has a simple tongue and groove sliding connection 315 with the head or flange 303, so as to permit the carriage to be slid outwardly to the left, or inwardly, or forwardly to the right. To effect such sliding movements of the first carriage, there is provided a screw 316 mounted in the head 303, and held from endwise movement therein by an angle iron 317 secured to the head and engaging between two collars of the screw. The threaded portion of the screw 316 engages the threaded recess of a depending leg 318 beneath carriage 314. By this arrangement, which is actuated by a hand wheel 319 at the extremity of the screw 316, the operator is enabled to quickly move the carriage 314 and the toe wiping mechanism forwardly toward the shoe, or to retract it to the left, at will.

Above the first carriage 314 is the second carriage 320. This constitutes an arc shaped slide for giving a circular motion for the purpose of effecting any desired lateral tilt or incline of the lasting mechanism. The sliding connection between the second and first carriages is afforded by curved flanges or feet 321 at the lower side of the second carriage, these feet extending outwardly and resting upon correspondingly curved ribs 322 of the first carriage. Suitable angle plates 323 overlap the curved feet 321, confining them in place.

To effect relative sliding between the second and first carriages in order to tilt the former as desired, a worm 325 is mounted in the first carriage, it having an accessible hand wheel 326 for turning it, and the worm engages with the teeth of a curved rack 327 at the lower side of the second carriage.

Above and supported upon the second carriage 320 is a third carriage 330. The fittings between the second and third carriages are similar to those between the first and second carriages, but are set at right angles so that adjustment of the third carriage varies the longitudinal tilt or incline of the wiping mechanism. The third carriage has curved feet or flanges 331 at its lower side, bearing upon the curved upper surface 332 of the second carriage and confined by angle plates 333. A worm 335 turned by an exterior hand wheel 336 engages the teeth of a curved rack 337 on the third carriage. The operator, by means of the hand wheel varies the longitudinal tilt as desired.

The connections thus far described, afford rising and falling movements, forward and rearward swinging, rightward and leftward sliding, and lateral and longitudinal tilting of the toe wiping mechanism. Two additional movements are provided by the fourth and fifth carriages, as will be described.

The fourth carriage 340 is a transversely sliding one, providing the necessary adjustment required from the fact that the inclination or swing of the toe portions of different shoes varies. The fourth carriage is mounted on a dovetail guideway 341 and the fourth carriage is moved laterally on the said guideway by an adjusting screw 342 engaging in a depending threaded lug 343 of the fourth carriage, the screw being journaled in the third carriage and held against longitudinal movement. A hand wheel 344 at the exterior extremity of the screw, enables the adjustment to be readily made.

The topmost or fifth carriage 350, which carries the toe-wiper plates in their advancing and retracting movements, has an ordinary dove-tail sliding connection 351 with the carriage 340 beneath. For effecting the advancing and retracting movement of the topmost carriage a bracket 352 upstanding from the fourth carriage, see Fig. 2, affords a fulcrum for a hand lever 353, see Figs. 3 and 30. The hand lever is connected by link 354 provided on the top of the carriage 350. Thereby swinging the lever right and left by hand causes the advance and retraction of the wiper plate carriage.

In order that the wiper plates and their carriage may be locked forward in their advanced position, a spring latch lever 356 is mounted upon the actuating lever 353, the latch lever having an extension which passes downwardly through the hand lever into engagement with a toothed segment 357 secured to the side of the fourth carriage 340. This arrangement serves to hold the wiper plates in their advanced position until the latch is released by depressing the latch lever 356, whereupon the hand lever may be swung back to its leftward position.

It is very desirable for several reasons to effect the lasting of shoes in pairs, that is to say, the right shoe and then the left shoe of a pair. This system insures better uniformity in the right and left shoes of a pair as compared with a system whereby the operator first attends to a batch of right shoes and then a batch of lefts. The adjustments, however, which would be necessary to re-adapt a set of wiper-plates from the lasting of rights to lefts, and vice versa, would be very extensive, more so, indeed, in some cases than the adjustments for changing from one style to another. It is, therefore, preferred to provide the toe lasting mechanism with two readily and quickly interchangeable sets of wiper-plates, namely, one set for right shoes and the other set for left shoes. In this way are minimized the adjusting operations so that it is practicable to last alternately rights and lefts on the present machine. Preferably the right and left wiper devices are not detachable as a whole, but are permanently mounted on the topmost carriage 350 in such manner as to be rapidly interchangeable in position. This interchangeable wiper mechanism will now be described. The wiper plates themselves may be detached and changed.

Forming a part of the wiper carriage 350, and extending at right angles to its direction of sliding and near its forward or right-hand end, is a wall 360. Pivoted interchangeable wiper devices are located forwardly of the wall 360. These devices preferably swing about a horizontal, lateral axis so that when one wiping device is in the wiping plane, the other stands at an angle thereto. Thus, as seen in Figs. 1 and 30, one wiping device is in wiping position in line with the carriage 350 and the other stands downwardly at right angles. By swinging the devices about their axes the lower device may be shifted into wiping position while the other one shifts upwardly into an idle position above the carriage. The details of the mechanism may be as follows: Referring particularly to Figs. 30 and 31, the wall 360 is shown as provided with a pair of rightwardly extending ears 361 in which is journaled a pivot shaft 362, about which the right-hand wiper box or device 363 and the left-hand wiper box or device 364 may pivot when being swung into and out of wiping position.

The two wiper boxes 363 and 364 may constitute an integral casting as shown. They extend at right angles to each other from the axis or pivot shaft 362. When one wiper box is in its operative position, for example, the right wiper box 363, as shown, the other wiper box stands adjacent to, and, in fact, abuts against, the wall 360, which affords a solid support so that the active wiper device will be firmly held in its operative position. The inoperative wiper box is locked in contact against the wall 360 by means of spring latches or hooks 365, mounted on the wall 360 and arranged to firmly engage with, a wedging engagement, the wedge shaped locking pins 366 formed on the respective boxes 363 and 364. By this arrangement the change from right to left wiper boxes may be very expeditiously effected, namely, by simply pressing the tail of the latch 365 by hand and swinging the wiping boxes about their pivot shaft until the other pin engages the other latch.

The construction and operation of the right and left wiper devices are practically the same, differing principally in the contour of the edges of the wiping plates. The description, therefore, can be confined to the right wiping device 363 by reference to Figs. 30 and 31.

With heretofore known systems and apparatus, great difficulty has been experienced in performing the lasting of the toes of shoes. One obstacle to obtaining a perfectly lasted toe has been the production of ridges or scratches upon the material of the toe caused by the corners of the wiping plates at the point where the plates lie adjacent to each other, for example, at the extreme point of the toe. This has been due to the fact that the toe wiper plates have not always presented an unbroken continuous wiping edge to the shoe, the separation of the plates by their relative swinging producing a gap or break in the continuity of the wiping edge. Even in machines wherein a continuous wiping edge has been attempted, the movements have generally been conveyed or guided by means of cam slots or rolls, which parts are subject to rapid wear giving looseness of action. Therefore, unless the parts have been in new condition, it has been impossible to maintain a continuous wiping edge. As is well known, it is desirable that the two halves of a set of wiper plates should meet each other at the center or point of the toe, but after a small amount of use the resulting wear begins to show in the relative separation of the plates at this point. As explained, this is not conducive to perfect lasting, since the gap in the wiping edge causes the formation of a ridge or scratching of the material of the upper or both a ridge and scratching at the point of the toe. An important part of the present improvement is the novel structure of toe wiping mechanism wherein these faults are eliminated. A pair of toe wiping plates 370 are shown, thus dividing the wiping devices into two halves as usual. The two plates are mounted in a manner to be described so as to swing in the arc of a circle simultaneously with the bodily movement of the wiper carriage, and the center of the swinging movement of the plates is exactly at the point 371 where the plates meet at the point of the toe. The mounting of the plates is such as to avoid wear or looseness of action and the swinging thereof is so effected that the plates are always in contact at the point 371 so as to never leave a gap or broken edge which may impair the work or the material.

Each of the toe wiping plates 370 is detachably mounted upon a segment shaped oscillating carrier 372. The carrier is adapted to swing about the point 371 as an axis and for this purpose is movably connected to the wiper box or plate 363 by means of a circular guide bearing 373. This curved guide-piece or bearing is secured to the box by means of a number of screws, some of which may pass through concentric slots in the carriers 372 so as not to interfere with the oscillatory movements of the carriers.

It should be explained that the peripheral or marginal portion of each carrier 372 is slightly raised, and this, together with the wiper plates 370 secured on top of the carrier forms a curved recess which snugly engages with the stationary guide bearing 373. By this structure the wiper-plates in their swinging movements are given a bearing surface of much greater diameter and area than with any prior arrangement that I am aware of, thus practically eliminating any harmful wear and insuring longer life to the parts and superior results in the wiping operation.

The wiper plates 370 are detachably engaged upon the carriers 372 merely by means of holes in the plates engaging pins on the carriers as shown. These parts and the other parts of the wiping mechanism are held down or confined in place above the box or plate 363 by a cover plate 374, shown in Figs. 3 and 30, but omitted from Fig. 31.

Having described the fittings by which the wiper-plates are guided, the actuating connections will now be referred to. The oscillating carriers are provided with toothed racks 375 at their peripheries, each rack engaging a pinion 376 and each pinion engaged by a sliding rack 377 having a hook 378 at its inner extremity arranged to engage with a coöperating hook 379 formed on a bracket or arm 380 secured at each side to the fourth carriage 340. These coöperating hooks 378, 379 are adapted to disengage and reëngage when the right wiper box and the left wiper box are interchanged in position, and the hooks are constructed with beveled edges to facilitate engaging them.

To facilitate interchange of toe wiping plates of different shapes for different styles or sizes of shoes, the cover plate 374 previously referred to, has its front portion in the form of a lid 382 hinged to permit it to be lifted and restored. Normally this lid is held tightly in its closed position by means of overhanging clamp brackets 383, which are tightened into place by thumb screws 384.

On top of the forward portion or lid of the cover plate 374, see Figs. 3 and 30, are a pair of upstanding pivot lugs 386 to which are pivoted the two side arms of the toe abutment 387 previously referred to. This bar 387 may be swung downwardly into operative position as seen in Fig. 3, in order to engage with and support the toe of the shoe during the heel lasting operations. After the heel lasting operation is completed, the toe lasting mechanism will be backed up slightly by the hand wheel 349. This permits the temporary toe abutment to be swung up out of the way preparatory to the toe lasting operations.

In performing the toe lasting operation, the operator will quickly adjust the mechanism so as to bring the wiper plates practically into contact with the upper at about the level of the sole of the shoe. By a manipulation of the pedal 308 and the hand lever 353, the wiper plates are slightly lifted and forced inwardly converging accordingly to the operator's choice and judgment. When the margins of the upper have been satisfactorily folded and wiped into place over the sole of the inverted shoe, the plates become locked in that position, and thereupon the operator may employ the same pedal 308 to effect a downward pressure on the wiper plates, so as to firmly press and crease the wiped edges of the upper snugly down upon the shoe sole and last.

It will be noted that the pedal 308 is a double acting pedal, the operator applying his foot to the left portion for lifting the toe wiping mechanism, and to the right hand portion for depressing it.

The action by which the right hand swinging movement of the hand lever 353 operates the wiper plates will be understood. It has been explained that the lever forces forwardly the topmost carriage 350, and that the wiper boxes advance with it. This gives the forward or advance movement to the wiper plates. Referring to Fig. 31, it will be observed that a relative retracting or leftward moving of the sliding racks 378 will cause the wiper plates to swing toward each other. Such relative rearward movement is effected by the act of forcing forward the wiper mechanism as a whole. This is by reason of the fact that the sliding racks are hooked by the racks 378 and 379 to the fourth carriage 340, which does not partake of the advancing movement. Thereby the advancing movement of the topmost carriage, simultaneously advances and swings toward each other the two wiper plates giving the desired wiping movement around the front end and the two sides of the toe.

In using the noun "position" in the claims, with reference to the shoe, I intend to refer either to the posture of the shoe or its location. When I refer to the "shifting" of the shoe or shifting its position without stating specifically whether this involves a change of posture or a change of location, I mean a shifting either of posture or location or of both.

It will thus be seen that I have described a novel method, machine, mechanisms, combinations, devices and arrangements embodying the principles and containing the objects and advantages of the present invention.

Since many matters of design, arrangement, combination, detail and other features might be variously modified without departing from the main principles hereof, it is not intended to limit the present invention to such features except in so far as is specified in the appended claims.

What is claimed is:

1. A shoe lasting machine including in combination means for holding a shoe and for shifting it between pulling-over operation and lasting operation, means for pulling-over the upper before such shifting, said pulling-over means being secured against shifting with the shoe but adapted to release the shoe before the latter is shifted, and means for wiping the shoe after the latter is shifted.

2. A shoe lasting machine including in combination, a shoe holder, mechanism for pulling-over the edges of the upper of a shoe in said holder and then releasing the same, said holder with the shoe adapted to be shifted relatively to the pulling-over mechanism after release therefrom, and wiping mechanism arranged to operate upon the shoe after such shifting.

3. A shoe lasting machine including in combination, a shoe holder, mechanism for pulling-over the edges of the upper of a shoe in said holder and then releasing the same, said holder with the shoe adapted to be shifted relatively to the pulling-over mechanism after release therefrom, means for clamping the pulled-over upper upon the last after the pulling-over is performed and maintaining it clamped during such shifting, and wiping mechanism arranged to operate upon the shoe after such shifting.

4. A shoe lasting machine including in combination means for giving underneath support to a shoe, means for pulling-over the upper while so supported, means for clamping the upper against the last, before the upper is released from the pulling-over means and maintaining it so clamped until the completion of the lasting, means for inverting the shoe in the machine after the pulling-over and clamping operations, and means for wiping the margins of the upper about the bottom of the last while still clamped in the machine.

5. A shoe-lasting machine including in combination an invertible jack comprising means operable before inversion for clamping the shoe upper and last therein, pulling-over mechanism for shaping the upper about the last while upper side upmost, and wiping mechanism for shaping the clamped upper about the last after the jack and shoe have been inverted in the machine.

6. A shoe-lasting machine including in combination a universal jack in which a shoe may be secured, said jack shiftable for inverting the shoe and swinging it horizontally, a pulling-over mechanism coöperating with the first shoe posture, and wiping mechanism coöperating with its inverted posture.

7. A shoe-lasting machine including in combination a shoe jack-and-clamp having swinging adjustment about three axes for adjusting the shoe posture during lasting operations between pulling-over posture, side-lasting posture and heel and toe lasting posture, and pulling-over and lasting mechanisms coöperating therewith.

8. A shoe-lasting machine including in combination a shoe jack-and-clamp having swinging adjustment about three axes for adjusting the shoe posture during lasting operations between pulling-over posture, side-lasting posture, and heel and toe lasting posture, all said axes passing substantially through the shoe whereby its change of posture is effected without substantially changing its location, and pulling-over and lasting mechanisms coöperating therewith.

9. A shoe-lasting machine including in combination pulling-over mechanism, a shiftable jack, means for clamping the pulled-over upper to the last before release from the pulling-over mechanism, and maintaining it so clamped while held in the jack during shifting thereof, and wiping-mechanism coöperating with the shoe held in the jack in the shifted position thereof.

10. A shoe-lasting machine including in combination pulling-over mechanism, a shiftable jack, means constituting a permanent part of the jack adapted for clamping the pulled-over upper to the last before release from the pulling-over mechanism, and maintaining it so clamped while held in the jack during shifting thereof, and wiping-mechanism coöperating with the shoe held in the jack in the shifted position thereof.

11. A shoe lasting machine including in combination, a shoe holder, mechanism for pulling-over the edges of the upper of a shoe in said holder and then releasing the same, said holder with the shoe adapted to be inverted or shifted to a new posture after release from the pulling-over mechanism, and wiping mechanism arranged to operate upon the shoe after such shifting.

12. A shoe lasting machine including in combination, a shoe holder, mechanism for pulling-over the edges of the upper of a shoe in said holder and then releasing the same, said holder with the shoe adapted to be inverted or shifted to a new posture after release from the pulling-over mechanism, means for clamping the pulled-over upper upon the last after the pulling-over is performed and maintaining it clamped during such shifting, and wiping mechanism arranged to operate upon the shoe after such shifting.

13. A shoe lasting machine including in combination, a shoe holder, mechanism for pulling-over the edges of the upper of a shoe in said holder and then releasing the same, said holder with the shoe adapted to be inverted or shifted to a new posture after release from the pulling-over mechanism, means constituting a permanent part of the machine adapted for clamping the pulled-over upper upon the last after the pulling-over is performed and maintaining it clamped during such shifting, and wiping mechanism arranged to operate upon the shoe after such shifting.

14. A shoe-lasting machine including in combination pulling-over and wiping mechanisms adapted to operate successively on the shoe in successive postures, and means for shifting the shoe through its successive postures without detachment from the machine, comprising an invertible jack, and means for holding the upper clamped against the last throughout such shifting, comprising a clamp carried by the jack and applicable to the upper before released from the pulling-over mechanism.

15. A shoe lasting machine including in combination pulling-over and wiping mechanisms adapted to operate successively on the shoe in successive postures, means for shifting the shoe through its successive postures relatively to the pulling-over mechanism and without detachment of the shoe from the machine, comprising an invertible jack, and means for holding the upper clamped against the last throughout such shifting, said holding means being applicable to the upper before the upper is released from the pulling-over mechanism, and connected to shift with the shifting of the jack.

16. A shoe-lasting machine including in combination mechanism for pulling over while the shoe is upper side up, mechanism for wiping the upper while the shoe is inverted, and a jack having a member or arm swingable about a horizontal side to side axis for inverting the shoe, and a second member or arm swinging about a vertical axis for swinging the shoe into wiping position.

17. A shoe-lasting machine including in combination mechanism for pulling-over while the shoe is upper side up, mechanism for wiping the upper while the shoe is inverted, and a jack having a member or arm swingable about a horizontal side to side axis for inverting the shoe, and a second member or arm swinging about a vertical axis for swinging the shoe into wiping position, and a shoe carrying member adapted to turn about a horizontal axis for tilting the shoe or setting it flatwise.

18. A shoe-lasting machine including in combination mechanism for pulling-over while the shoe is upper side up, mechanism for wiping the upper while the shoe is inverted, and a jack having a member or arm swingable about a horizontal side to side axis for inverting the shoe, and a second member or arm swinging about a vertical axis for swinging the shoe into wiping position, said axes substantially meeting in the shoe whereby changes of posture of the shoe are made without substantial change of location.

19. A shoe-lasting machine including in combination mechanism for pulling-over while the shoe is upper side up, mechanism for wiping the upper while the shoe is inverted, and a jack having a member or arm swingable about a horizontal side to side axis for inverting the shoe, and a second member or arm swinging about a vertical axis for swinging the shoe into wiping position, and a shoe carrying member adapted to turn about a horizontal axis for tilting the shoe or setting it flatwise, said axes substantially meeting in the shoe whereby changes of posture of the shoe are made without substantial change of location.

20. A shoe-lasting machine including in combination a frame to which the mechanisms recited are permanently connected; a pulling-over mechanism located generally to the rear of and below the location of the shoe adapted to pull over a shoe while held in said location in a posture with its upper side up and its toe higher than its heel and directed rearward from the operator; heel and toe wiping mechanisms located generally to the right and left of the shoe, and adapted to wipe the upper while the shoe is held in said location in a flatwise posture with its heel and toe directed right and left; and a jack mechanism adapted to engage with the shoe in said pulling-over posture and to retain the shoe and effect its shifting without changing its location into said wiping-posture.

21. A shoe-lasting machine including in combination a frame to which the mechanisms recited are permanently connected; a pulling-over mechanism located generally to the rear of and below the location of the shoe adapted to pull over a shoe while held in said location in a posture with its upper side up and its toe higher than its heel and directed rearward from the operator; heel and toe wiping mechanisms located generally to the right and left of the shoe, and adapted to wipe the upper while the shoe is held in said location in a flatwise posture with its heel and toe directed right and left; and a jack mechanism adapted to engage with the shoe in said pulling-over posture and to retain the shoe and effect its shifting without changing its location into said wiping-posture; and a clamp comprised with said jack mechanism adapted to securely clamp the pulled-over upper to the top side of the last and hold it throughout the shifting and wiping operations.

22. A shoe-lasting machine adapted for the lasting of shoes by the successive steps of pulling-over, side-lasting, and heel and toe lasting performed in different successive postures of the shoe, the said machine comprising a jack, shiftable with the shoe between such successive postures, in combination with pulling-over mechanism adapted to coöperate with the jack in one posture and lasting mechanism adapted to coöperate with the jack in a subsequent posture.

23. For the lasting of shoes the jack herein described comprising a frame, a shoe holding device, and three movable supports and fulcrums between said frame and said device, arranged so that said supports swing about substantially intersecting axes whereby the shoe when shifted between its successive postures maintains substantially a uniform location.

24. For the lasting of shoes the jack herein described comprising a frame, a shoe holding device, and three movable supports and fulcrums between said frame and said device, in combination with a pulling-over mechanism coöperating with the jack in its first posture and a lasting mechanism coöperating with the jack in its final posture.

25. For the lasting of shoes a jack comprising a frame, a shoe holding device, and three movable supports and fulcrums between said frame and said device, whereby the shoe may be swung about a horizontal axis to invert it, or about a vertical axis to present different sides of the shoe to the operator, or tilted with its clamp between flatwise and inclined postures.

26. For the lasting of shoes a shiftable jack comprising a shoe support beneath the shoe last and a clamping device applicable to press the upper upon the top side of the last and hold it through the shifting of the jack.

27. For the lasting of shoes a shiftable jack comprising a shoe support beneath the shoe last and a clamping device constituting a permanent part of the jack and applicable to press the upper upon the top side of the last and hold it through the shifting of the jack.

28. For the lasting of shoes a shiftable jack comprising a shoe support beneath the shoe last and a clamping device applicable to press the upper upon the top side of the last and hold it through the shifting of the jack, in combination with pulling-over mechanism adapted to be released from the upper after the clamping device is applied thereto but before the shifting of the jack.

29. For the lasting of shoes a shiftable jack comprising a shoe support beneath the shoe last and a clamping device applicable to press the upper upon the top side of the last and hold it through the shifting of the jack, said device having means for adjusting it to different sizes and styles of shoes.

30. A shoe lasting machine including in combination a shiftable jack comprising a shoe support beneath the shoe last, pulling-over mechanism coöperating with said jack in one position, wiping mechanism coöperating with said jack in a subsequent position thereof, and an upper clamping device constructed and adapted to be applicable, after the pulling-over is performed but before the pulling mechanism has released the upper, and such as to incur no interference with the lasting operation but adapted to hold the upper upon the top side of the last throughout the shifting movements of the jack.

31. For the lasting of shoes a shiftable jack comprising a shoe support beneath the shoe last and a clamping device applicable to press the upper upon the top side of the last and hold it through the shifting of the jack, and a shoe holding joint in the shoe support normally protected by a depressible guard.

32. For the lasting of shoes a shiftable jack comprising a shoe support beneath the shoe last and a clamping device applicable to press the upper upon the top side of the last and hold it through the shifting of the jack, said shoe support adapted to support the shoe during the pulling-over operation before the clamp device is applied, and to coöperate with the clamp in holding the shoe for the subsequent lasting steps.

33. A shoe-lasting machine including in combination means for supporting a shoe, and mechanism for pulling-over the upper of the shoe, said mechanism comprising an operating lever having connections for pulling-over the toe end of the upper, a single operating lever having connections for pulling-over simultaneously both side portions of the upper, and two independent operating levers, each having connections for pulling one of the two sides respectively of the upper.

34. A shoe-lasting machine including in combination means for supporting a shoe, and mechanism for pulling-over the upper of the shoe, said mechanism comprising an operating lever having connections for pulling-over the toe end of the upper, a single operating lever having connections for pulling-over simultaneously both side portions of the upper, two independent operating levers, each having connections for pulling one of the two sides respectively of the upper, and means for locking each of said independent levers in the positions to which the same are adjusted whereby, after preliminary pulling with said levers, the final pulling-over may be effected by the first two mentioned levers.

35. A shoe lasting machine including in combination means for supporting the shoe and mechanism for pulling-over the upper of the shoe, said mechanism comprising a set of grippers, means for effecting the closing of said grippers, and means for effecting the locking of said grippers in closed position.

36. A shoe lasting machine including in combination means for supporting the shoe and mechanism for pulling-over the upper of the shoe, said mechanism comprising a set of grippers, means for effecting the closing of said grippers, comprising an operating lever and connections operated thereby for closing all the grippers simultaneously, and means for effecting the locking of said grippers in closed position comprising an automatic latch device for each gripper adapted to be subsequently tripped for reopening the grippers.

37. A shoe-lasting machine including in combination means for supporting an inverted shoe flatwise, a heel-wiping mechanism, a toe-wiping mechanism, and a temporary toe abutment carried by the toe-wiping mechanism for giving support to the shoe toe during the heel lasting operations, said abutment being removable or adjustable from and into position so that the upper near the heel may be left free from contact by said abutment during the heel wiping operation.

38. A shoe-lasting machine including in combination means for supporting an inverted shoe flatwise, wiping mechanisms for both the heel and toe ends of the shoe and an abutment mounted in a removable or adjustable manner adjacent one of said wiping mechanisms for giving support to the shoe at that end during the wiping operations at the other end.

39. In a shoe-lasting machine wiping mechanism, comprising wiping plates, means for actuating them to move toward the shoe and swing toward each other, and means for independently adjusting them toward and from each other, said adjusting means being independent of said actuating means.

40. In a shoe lasting machine wiping mechanism comprising wiping plates, means for actuating them to move toward the shoe and swing toward each other, and means operable before the wiping operation for effecting a slight adjustment of one plate toward or from the other.

41. In a shoe-lasting machine wiping mechanism including relatively swingable wiping plates forming a continuous wiping edge at all times, and large-diameter bearings for permitting the plates to swing about a point in the wiping edge thereof.

42. In a shoe-lasting machine, wiping mechanism including relatively swingable wiping plates forming a continuous wiping edge at all times during wiping operations, and an annular bearing located at a substantial radius from the meeting point of said plates and having a continuous contact surface with said plates.

43. In a shoe-lasting machine, heel lasting mechanism including a universally adjustable carriage, heel clamping devices carried on said carriage, and heel wiping devices carried on said carriage, means for advancing the carriage toward the shoe and means whereby the advance of the carriage automatically sets the clamp upon the shoe.

44. In a shoe-lasting machine, heel lasting mechanism including a universally adjustable carriage, heel clamping devices carried on said carriage, and heel wiping devices carried on said carriage, said clamping devices comprising a rear clamp pad and opposite side pads and connections whereby the pressure of the shoe on the rear pad during the advance of the carriage automatically forces the side pads against the shoe.

45. In a shoe-lasting machine, toe lasting mechanism comprising a set of wiper plates, an operating lever or member and connections for advancing and swinging said plates toward each other to wipe the toe of the shoe, and means for bodily swinging said plates out of wiping position and interchanging them with another set, without detachment, so as to bring either set into operative relation with said operating lever or member.

46. In a shoe-lasting machine, toe lasting mechanism comprising a set of wiper plates, means for advancing and swinging said plates toward each other to wipe the toe of the shoe, and means for bodily swinging said plates about an axis substantially parallel to the plane of the plates so as to shift them out of the wiping plane and to thereby interchange them with another set similarly swung into the wiping plane, and without detachment of either set of wiping plates from the machine.

47. In a shoe-lasting machine, toe lasting mechanism comprising a set of wiper plates, means for advancing and swinging said plates toward each other to wipe the toe of the shoe, means for bodily swinging said plates about an axis substantially parallel to the plane of the plates so as to shift them out of the wiping plane and to thereby interchange them with another set similarly swung into the wiping plane, and without detachment of either set of wiping plates from the machine, an operating handle, and operating connections extending from said handle adapted to be automatically coupled to either set of plates upon swinging such plates into the wiping plane.

48. In a shoe-lasting machine, toe lasting mechanism comprising a wiper carriage, means for adjusting it to different styles of shoes, means for advancing the carriage to cause wiping operations, two wiper boxes carried at the forward end of said carriage arranged to be quickly adjusted into and out of wiping position, a set of wiper plates for right shoes on one box, a corresponding set of wiper plates for left shoes on the other box, and connections whereby the plates which are in wiping position are caused to automatically swing toward each other when advanced.

In testimony whereof, I have affixed my signature hereto.

ANGELO PERRI.

Witnesses:
FRANCIS A. SHEA,
F. W. TUCKER.

Copies of this patent may be obtained for five cents each, by addressing the "Commissioner of Patents, Washington, D. C."